United States Patent
Yoshizumi

(10) Patent No.: US 8,817,134 B2
(45) Date of Patent: Aug. 26, 2014

(54) IMAGING CONTROL DEVICE, SUBJECT DETECTION METHOD, AND PROGRAM

(75) Inventor: Shingo Yoshizumi, Tokyo (JP)

(73) Assignee: Sony Corporation, Tokyo (JP)

( * ) Notice: Subject to any disclaimer, the term of this patent is extended or adjusted under 35 U.S.C. 154(b) by 478 days.

(21) Appl. No.: 13/034,116

(22) Filed: Feb. 24, 2011

(65) Prior Publication Data
US 2011/0216225 A1 Sep. 8, 2011

(30) Foreign Application Priority Data

Mar. 5, 2010 (JP) ................................ 2010-048793

(51) Int. Cl.
*H04N 5/262* (2006.01)

(52) U.S. Cl.
USPC ...................................................... 348/240.3

(58) Field of Classification Search
USPC ...................................................... 348/240.3
See application file for complete search history.

(56) References Cited

U.S. PATENT DOCUMENTS

| 8,176,426 | B2* | 5/2012 | Mitsuhashi | 715/730 |
|---|---|---|---|---|
| 2006/0069999 | A1* | 3/2006 | Mitsuhashi | 715/723 |
| 2006/0126894 | A1* | 6/2006 | Mori | 382/103 |
| 2007/0040903 | A1* | 2/2007 | Kawaguchi | 348/14.08 |
| 2009/0103778 | A1* | 4/2009 | Yoshizumi et al. | 382/103 |
| 2011/0043662 | A1* | 2/2011 | Kim | 348/240.2 |
| 2011/0181687 | A1 | 7/2011 | Yoshizumi | |
| 2011/0181690 | A1 | 7/2011 | Yoshizumi | |
| 2011/0216159 | A1 | 9/2011 | Yoshizumi | |
| 2012/0002075 | A1 | 1/2012 | Yoshizumi et al. | |

FOREIGN PATENT DOCUMENTS

JP 2009-100300 A 5/2009

OTHER PUBLICATIONS

U.S. Appl. No. 12/985,809, filed Jan. 6, 2011, Yoshizumi.
U.S. Appl. No. 13/008,110, filed Jan. 18, 2011, Yoshizumi.
U.S. Appl. No. 13/037,638, filed Mar. 1, 2011, Yoshizumi.
U.S. Appl. No. 13/161,638, filed Jan. 16, 2011, Yoshizumi et al.

* cited by examiner

*Primary Examiner* — James Hannett
(74) *Attorney, Agent, or Firm* — Wolf, Greenfield & Sacks, P.C.

(57) ABSTRACT

An imaging control device for an imaging apparatus or an imaging system having an imaging section which performs imaging of a subject and an imaging field changing section of the imaging section, includes: a determination section which determines whether or not a subject detecting section detects a predetermined target subject by analyzing a captured image signal acquired by the imaging section, in a subject detection processing; and an imaging field change control section which controls the imaging field changing section to change an angle of view in the imaging section, wherein when the determination section determines that the subject detecting section does not detect a target subject in the subject detection processing, the imaging field change control section controls the imaging field changing section to change the angle of view in the imaging section and then the image control device controls the subject detecting section to perform the subject detection processing.

17 Claims, 25 Drawing Sheets

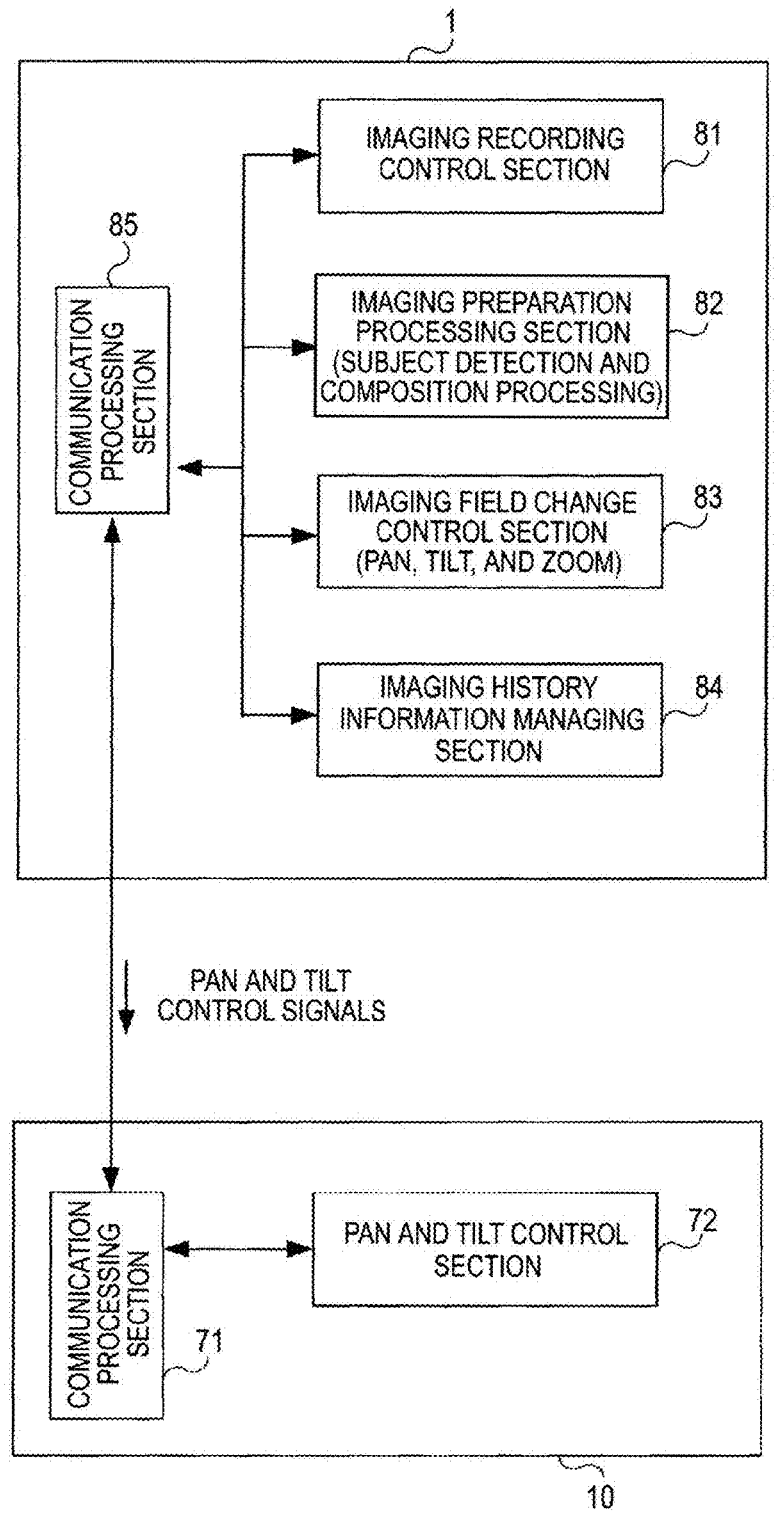

FIG.23

| | FILE NAME | IMAGING DATE AND TIME INFORMATION | ZOOM MAGNIFICATION INFORMATION | PAN AND TILT POSITION INFORMATION | INFORMATION REGARDING THE NUMBER OF SUBJECTS | INDIVIDUAL RECOGNITION INFORMATION | INFORMATION REGARDING POSITION WITHIN IMAGE FRAME | SIZE INFORMATION | FACE DIRECTION INFORMATION | EXPRESSION INFORMATION |
|---|---|---|---|---|---|---|---|---|---|---|
| 1 | | | | | | | | | | |
| 2 | FILE NAME | IMAGING DATE AND TIME INFORMATION | ZOOM MAGNIFICATION INFORMATION | PAN AND TILT POSITION INFORMATION | INFORMATION REGARDING THE NUMBER OF SUBJECTS | INDIVIDUAL RECOGNITION INFORMATION | INFORMATION REGARDING POSITION WITHIN IMAGE FRAME | SIZE INFORMATION | FACE DIRECTION INFORMATION | EXPRESSION INFORMATION |
| | | | | | | | | | | |
| n | FILE NAME | IMAGING DATE AND TIME INFORMATION | ZOOM MAGNIFICATION INFORMATION | PAN AND TILT POSITION INFORMATION | INFORMATION REGARDING THE NUMBER OF SUBJECTS | INDIVIDUAL RECOGNITION INFORMATION | INFORMATION REGARDING POSITION WITHIN IMAGE FRAME | SIZE INFORMATION | FACE DIRECTION INFORMATION | EXPRESSION INFORMATION |

UNIT IMAGING HISTORY INFORMATION

IMAGING CONTROL DEVICE, SUBJECT DETECTION METHOD, AND PROGRAM

BACKGROUND OF THE INVENTION

1. Field of the Invention

The present invention relates to an imaging control device and a subject detection method for an imaging apparatus or an imaging system. In addition, the present invention relates to a program for realizing the imaging control device and the subject detection method.

2. Description of the Related Art

JP-A-2009-100300 discloses a technique for performing automatic composition adjustment and automatic recording of a captured image, which is obtained by the composition adjustment, in an imaging system including a digital still camera and a camera platform which changes the pan/tilt direction of the digital still camera electrically.

In the technique disclosed in JP-A-2009-100300, a subject which is a person is searched for using a face detection technique, for example. Specifically, a subject (person's face) projected within the image frame is detected while rotating the digital still camera in the pan direction using the camera platform.

In addition, if a subject is detected within the image frame as a result of such a subject search, determination regarding the optimal composition corresponding to the detection state (for example, the number of subjects or the position or size of a subject) of a subject within the image frame at that point in time is performed (optimal composition determination). That is, optimal angles of pan, tilt, and zoom are calculated.

In addition, if the optimal angles of pan, tilt, and zoom are calculated by the optimal composition determination as described above, pan, tilt, and zoom angles are adjusted with the optimal angles as target angles (composition adjustment).

After the composition adjustment is completed, automatic recording of the captured image is performed.

According to the automatic imaging operation (automatic recording of a captured image) using such automatic composition adjustment, a captured image based on the optimal composition can be automatically recorded without a user's imaging operation.

SUMMARY OF THE INVENTION

In the automatic imaging, it is important to perform subject detection appropriately, for example. For example, when detecting a face, a face image is recognized by analysis of a captured image signal and processing of determining whether or not a face as a subject is included is performed. In this case, however, it is difficult to recognize the face image satisfactorily unless the angle of view is appropriate.

The angle of view at the time of imaging is set by the zoom magnification, for example.

First of all, it is preferable that the subject detection is performed in a wide imaging field of view to some extent. This is for searching in a wide range. For this reason, it is preferable to perform a subject detection operation by setting a zoom lens to the wide end, for example.

However, if the zoom lens is set to the wide end, for example, a distance to a subject which is effective in face detection becomes short. That is, in a captured image signal, a distance to a subject at which a face image with a size, in which a face can be recognized by image analysis, is obtained becomes short. In this case, for example, a situation occurs in which a face of a person existing 2 m ahead in the forward direction (imaging direction) of a camera is recognizable but it is difficult to recognize a face of a person existing 4 m ahead.

That is, in order to perform subject detection with a face or the like as a target subject, it is desirable to set the zoom lens to the wide end as much as possible so that the search range becomes wide vertically and horizontally. In this case, however, a detectable range in a direction of the distance to a subject (depth direction of the imaging field of view) becomes narrow. As a result, it is difficult to perform the subject detection satisfactorily.

Even if a person's face or the like is actually included in a captured image signal, if a situation continues in which it is difficult to detect the subject due to reasons such as a long distance to the subject, the efficiency of the subject detecting operation also becomes worse. As a result, for example, it is difficult to appropriately execute the automatic imaging described above.

In view of the above, it is desirable to make possible appropriate and efficient execution of subject detection.

According to an embodiment of the present invention, an imaging control device for an imaging apparatus or an imaging system having an imaging section which performs imaging of a subject and an imaging field changing section of the imaging section includes: a determination section which determines whether or not a subject detecting section detects a predetermined target subject by analyzing a captured image signal acquired by the imaging section, in a subject detection processing; and an imaging field change control section which controls the imaging field changing section to change an angle of view in the imaging section. Moreover, when the determination section determines that the subject detecting section does not detect a target subject in the subject detection processing, the imaging field change control section controls the imaging field changing section to change the angle of view in the imaging section and then the imaging control device controls the subject detecting section to perform the subject detection processing.

In addition, in the imaging apparatus or the imaging system, a zoom lens driving mechanism of the imaging section may be provided as an imaging field changing section. The imaging field change control section may control driving of the zoom lens driving mechanism to change the angle of view in the imaging section.

In addition, the target subject may be an image of a face of a person in a captured image signal.

When the determination section determines that the subject detecting section does not detect a target subject (for example, an image of a person's face) but detects the existence of a second target subject (for example, a moving subject image or an image of a person's body) in the subject detection processing, the imaging field change control section may control the imaging field changing section to change the angle of view in the imaging section and then the image control device controls the subject detecting section may perform the subject detection processing.

Alternatively, when the determination section determines that the subject detecting section does not detect a target subject but detects the existence of a second target subject in the subject detection processing, the imaging field change control section may control the imaging field changing section to change the angle of view in the imaging section and control an imaging direction change driving mechanism, such as a pan mechanism or a tilt mechanism, to set the imaging direction to an imaging direction when the second target subject is detected and then the image control device controls the subject detecting section may perform the subject detection processing.

In addition, it may be possible to further include an imaging history information managing section which creates and manages imaging history information, which includes at least zoom information of the imaging section, in response to recording or outputting the captured image signal acquired by the imaging section as a still image signal. The imaging field change control section may control the imaging field changing section on the basis of the imaging history information to change the angle of view in the imaging section.

In addition, the imaging field change control section may control driving of the zoom lens driving mechanism to change the angle of view in the imaging section and then control driving of the zoom lens driving mechanism to restore the angle of view to a state before the change when the subject detecting section detects the target subject.

According to another embodiment of the present invention, a subject detection method of the imaging apparatus or the imaging system includes the steps of: determining whether or not a subject detecting section detects a predetermined target subject by analyzing a captured image signal acquired by the imaging section, in a subject detection processing; controlling the imaging field changing section to change an angle of view in the imaging section when it is determined that a target subject is not detected in the subject detection step; and performing the subject detection processing again after changing the angle of view in the angle-of-view changing step.

According to still another embodiment of the present invention, there is provided a program for an operation of an imaging control device for the imaging apparatus or the imaging system. This program is a program causing an arithmetic processing unit of the imaging control device to execute the steps described above.

In the embodiments of the present invention, as first subject detection processing, a target subject, such as a face image, is searched for in a wide range by setting a wide angle of view, for example. Then, when a target subject is not found, the angle of view is changed, that is, a detectable distance to a subject is changed to perform subject detection processing. This is to try the subject detection again in a state where a face image or the like, which was not able to be detected at first, can be recognized.

In particular, when a moving subject image or an image of a person's body which is relatively easily recognized is detected in the first subject detection processing even if it is difficult to recognize a face, the existence of a person can be presumed. Therefore, second and subsequent subject detection processing after changing the angle of view becomes effective.

According to the embodiments of the present invention, even a target subject which is difficult to recognize due to the distance to the subject can be detected. As a result, appropriate and efficient subject detection can be realized.

BRIEF DESCRIPTION OF THE DRAWINGS

FIG. 22 is an explanatory view of an example of the control function configuration when the imaging history information of the embodiment is used;

FIG. 23 is an explanatory view of the imaging history information of the embodiment;

DESCRIPTION OF THE PREFERRED EMBODIMENTS

Figure 1A:
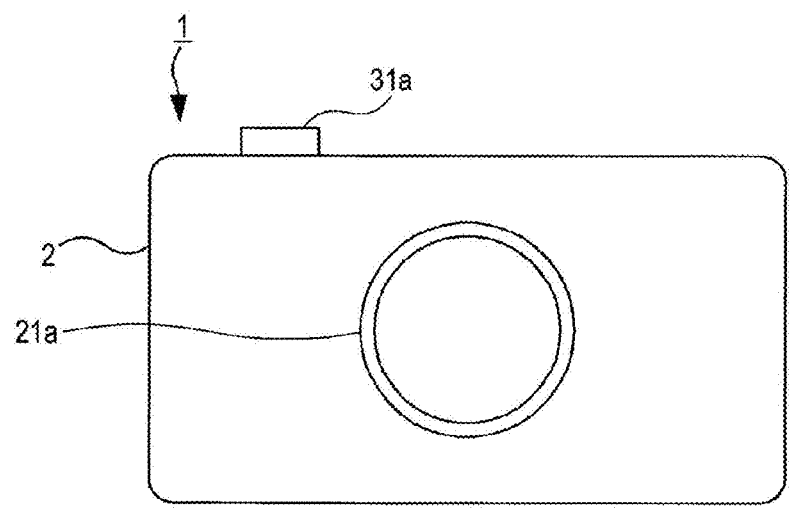
FIGS. 1A and 1B are front and back views of a digital still camera of an embodiment of the present invention.

Hereinafter, embodiments of the present invention will be described in following order. In the embodiments, a digital still camera and a camera platform on which the digital still camera can be mounted will be mentioned as examples. Imaging may be performed with a digital still camera alone, but an imaging operation may also be performed by an imaging system in which a digital still camera is combined with a camera platform.

<1. Configuration of an imaging system>
[1-1: Overall configuration]
[1-2: Digital still camera]
[1-3: Camera platform]
<2. Example of functional configuration>
<3. Example of subject search operation>

<4. Automatic still image capture mode processing>
<5. Example of subject detection processing in an embodiment>
    [5-1: First processing example]
    [5-2: Second processing example]
    [5-3: Third processing example]
    [5-4: Fourth processing example]
    [5-5: Fifth processing example]
    [5-6: Sixth processing example]
    [5-7: Utilization of imaging history information]
    [5-8: Modifications]
<6. Other examples of functional configuration>
<7. Processing at the time of handheld imaging>
<8. Program>

In this specification, terms of "image frame", "angle of view", "imaging field of view", and "composition" are used, and the definition of each term is as follows.

The "image frame" means a region equivalent to one screen in which, for example, an image is fitted. Generally, the "image frame" has a rectangular frame shape which is vertically or horizontally long.

The "angle of view" is also called a zoom angle and the like. This expresses a range set in the image frame, which is determined by the position of a zoom lens in an optical system of an imaging apparatus, as an angle. Generally, the "angle of view" is determined by the focal distance of an imaging optical system and the size of an image surface (an image sensor or a film). Here, an element which may change according to the focal distance is called the angle of view.

The "imaging field of view" indicates a field of view in an imaging optical system. That is, the "imaging field of view" is a range, which is set in the image frame as an imaging target, of the scene around an imaging apparatus. The "imaging field of view" is determined not only by the angle of view but also by a swing angle in the pan (horizontal) direction and an angle (angle of elevation and angle of depression) in the tilt (vertical) direction.

The "composition" is also called framing herein. For example, this means an arrangement state after the size of a subject within the image frame determined by the imaging field of view is set.

<1. Configuration of an Imaging System>
[1-1: Overall Configuration]

An imaging system of an embodiment includes a digital still camera 1 and a camera platform 10 to which the digital still camera 1 is detachably fixed.

The camera platform 10 changes a pan/tilt direction of the digital still camera 1 electrically. In addition, automatic composition adjustment and automatic recording of a captured image obtained by the composition adjustment are performed.

For example, a subject which is a person is searched for using a face detection technique. Specifically, a subject (person's face) projected within the image frame is detected while rotating the digital still camera 1, for example, in the pan direction by the camera platform 10.

Moreover, if a subject is detected within the image frame as a result of such subject search, determination of the optimal composition corresponding to the detection state (for example, the number of subjects or the position or size of a subject) of a subject within the image frame at that point in time is performed (optimal composition determination). That is, optimal angles of pan, tilt, and zoom are calculated.

In addition, if the optimal angles of pan, tilt, and zoom are calculated by the optimal composition determination as described above, pan, tilt, and zoom angles are adjusted with the optimal angles as target angles (composition adjustment).

After the composition adjustment is completed, automatic recording of the captured image is performed.

According to the automatic imaging operation (automatic recording of a captured image) using such automatic composition adjustment, a captured image based on the optimal composition can be automatically recorded without a user's imaging operation.

Figure 1B:
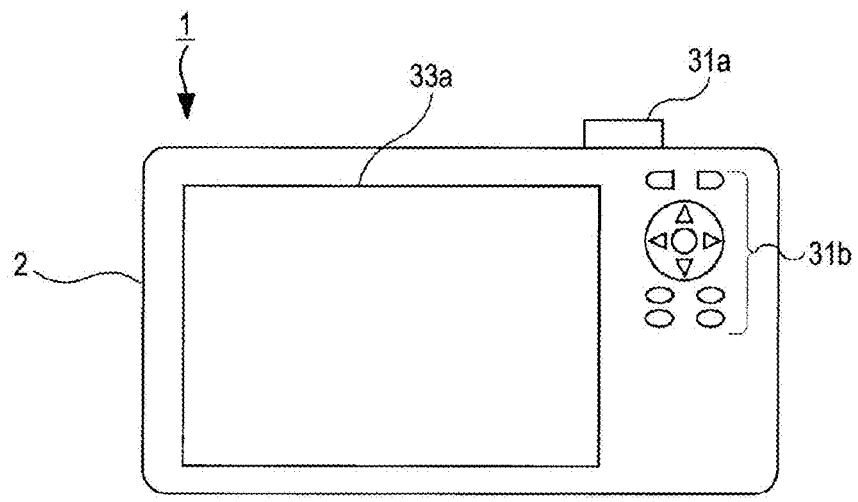

FIGS. 1A and 1B show an example of the appearance of the digital still camera 1. FIGS. 1A and 1B are front and back views of the digital still camera 1, respectively.

As shown in FIG. 1A, the digital still camera 1 has a lens section 21a at the front surface side of a main body 2. The lens section 21a is an optical system for imaging, and is a part exposed to the outside of the main body 2.

In addition, a release button 31a is provided at the upper surface section of the main body 2. In the imaging mode, an image (captured image) imaged by the lens section 21a is created as an image signal. In the imaging mode, captured image data of each frame is obtained at a predetermined frame rate by an image sensor to be described later.

Then, when an operation (release operation/shutter operation) on the release button 31a is performed, a captured image (frame image) at the timing is recorded in a recording medium as image data of a still image. That is, still image capturing, which is generally called photographing, is performed.

Moreover, as shown in FIG. 1B, the digital still camera 1 has a display screen section 33a at the back surface side.

In the imaging mode, an image, which is called a through image or the like and which is imaged by the lens section 21a at that time, is displayed on the display screen section 33a. The through image is a moving image based on each frame image obtained by an image sensor and is also an image showing a subject at that time as it is.

In addition, in a reproduction mode, the image data recorded in a recording medium is reproduced and displayed.

Moreover, an operation image as a GUI (Graphical User Interface) is displayed in response to a user's operation performed on the digital still camera 1.

In addition, a touch panel may be combined with the display screen section 33a so that the user can perform a necessary operation by touching the display screen section 33a with a finger.

In addition, controls 31b other than the release button 31a, such as various kinds of keys and dials, are provided in the digital still camera 1.

For example, they are operation keys and dials for zoom operation, mode selection, menu operation, cursor operation on a menu, and reproduction operation.

Figure 2:
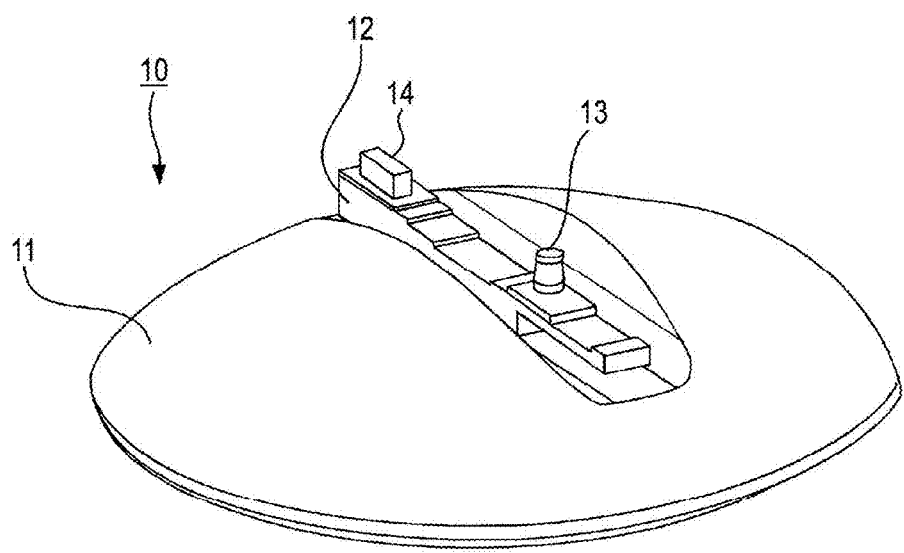
FIG. 2 is a perspective view of a camera platform on which the digital still camera of the embodiment can be mounted.
Figure 3:
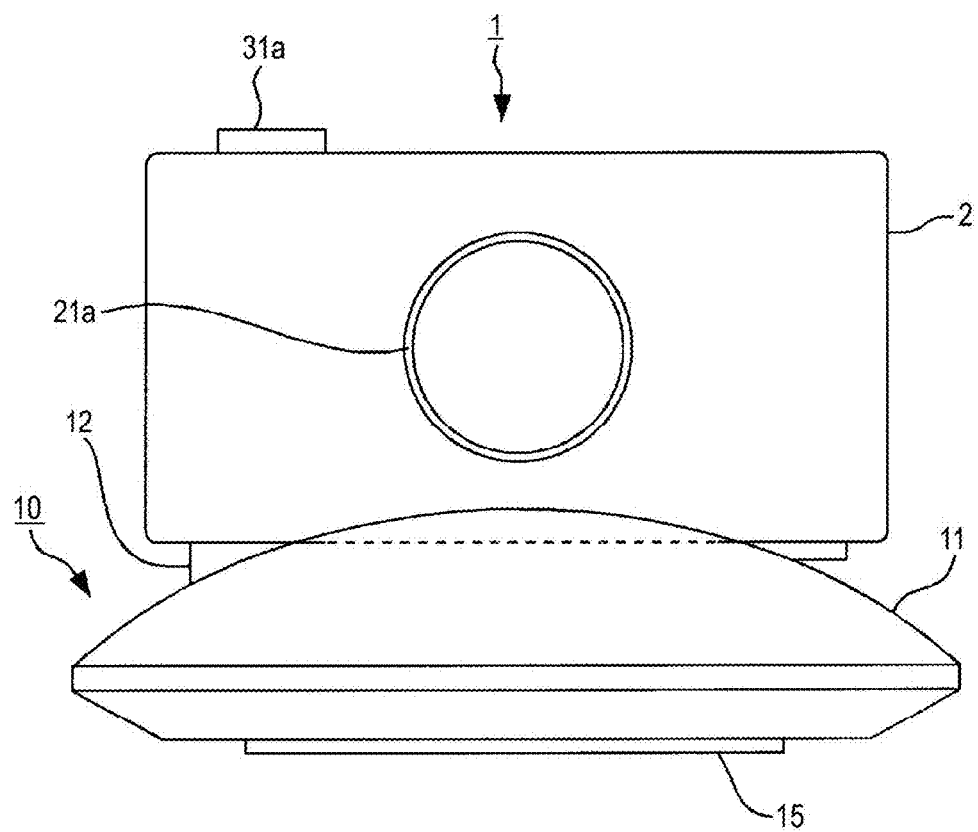
FIG. 3 is a front view in a state where the digital still camera of the embodiment is fixed to the camera platform.
Figure 4:
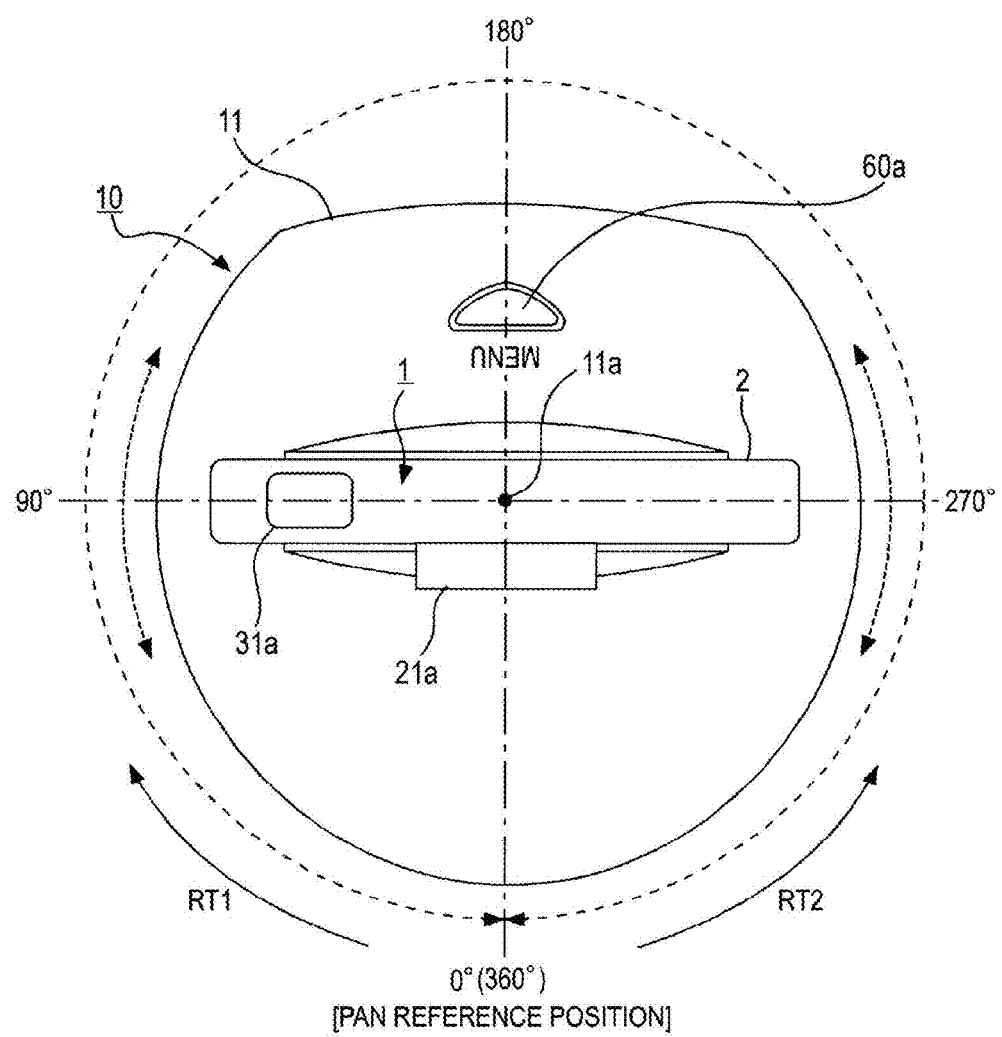
FIG. 4 is an explanatory view of the movement in a pan direction in a state where the digital still camera of the embodiment is fixed to the camera platform.
Figure 5A:
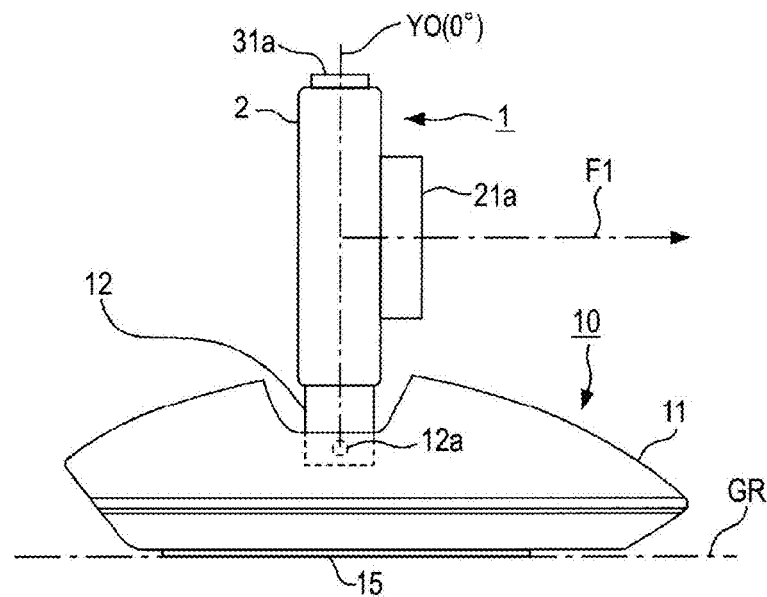
FIGS. 5A and 5B are explanatory views of the movement in a tilt direction in a state where the digital still camera of the embodiment is fixed to the camera platform.
Figure 5B:
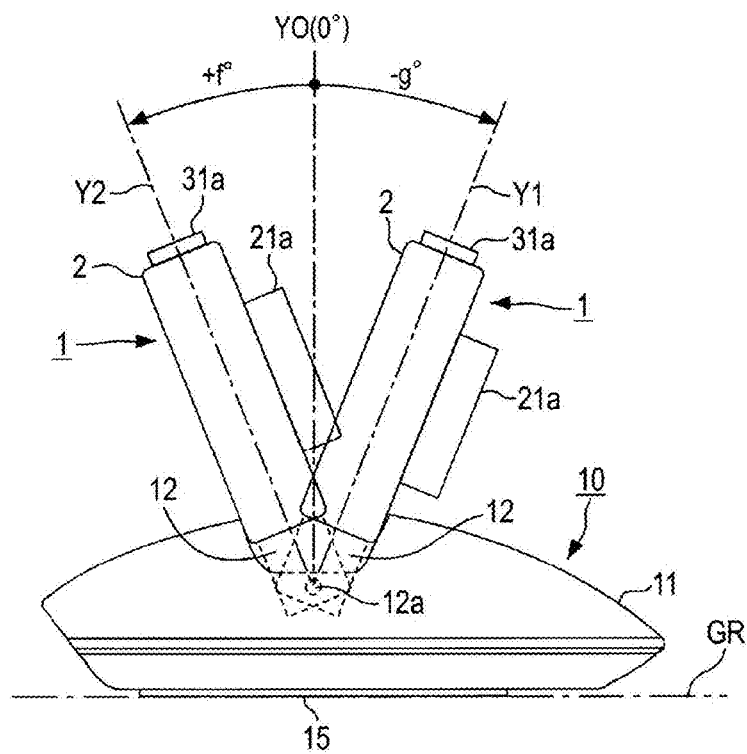

FIG. 2 is a perspective view showing the appearance of the camera platform 10. In addition, FIGS. 3 to 5B show a state where the digital still camera 1 is properly placed on the camera platform 10. FIG. 3 is a front view, FIG. 4 is a plan view, and FIGS. 5A and 5B are side views. In particular, FIG. 5B shows a movable range of a tilt mechanism through the side view.

As shown in FIGS. 2 to 5B, the camera platform 10 has a structure, in large, where a main body 11 is placed on a ground base 15 and a camera pedestal 12 is fixed to the main body 11.

When fixing the digital still camera 1 to the camera platform 10, the bottom surface side of the digital still camera 1 is put on the upper surface side of the camera pedestal 12.

As shown in FIG. 2, a protruding section 13 and a connector 14 are provided at the upper surface section of the camera pedestal 12. Although not shown, a hole engaged with the protruding section 13 is formed at the bottom surface section of the main body 2 of the digital still camera 1. In a state where the digital still camera 1 is properly placed on the camera pedestal 12, the hole and the protruding section 13 are engaged with each other. In this state, the digital still camera 1 does not deviate or shift from the camera platform 10 by a normal pan or tilt operation of the camera platform 10.

Moreover, in the digital still camera 1, a connector is also provided at the predetermined position of the bottom surface section. In a state where the digital still camera 1 is properly fixed to the camera pedestal 12 as described above, the connector of the digital still camera 1 and the connector 14 of the camera platform 10 are connected to each other so that at least mutual communication is possible.

Moreover, for example, the connector 14 and the protruding section 13 are set, in practice, so that the positions in the camera pedestal 12 can be changed (for example, moved) in a predetermined range. Moreover, by additionally using an adapter matched with the shape of the bottom surface section of the digital still camera 1, for example, a digital still camera of a different model can be fixed to the camera pedestal 12 in a state communicable with the camera platform 10.

Next, a basic movement of the digital still camera 1 in the pan or tilt direction using the camera platform 10 will be described.

First, the basic movement in the pan direction is as follows. In a state where the camera platform 10 is placed on a table or the floor, for example, the bottom surface of the ground base 15 is grounded. In this state, as shown in FIG. 4, the main body 11 can rotate clockwise or counterclockwise with a rotary shaft 11a as the center of rotation. That is, the imaging field of view in the horizontal direction (left and right directions) of the digital still camera 1 fixed to the camera platform 10 can be changed (so-called panning).

In this case, a pan mechanism of the camera platform 10 has a structure where rotation of 360° or more can be freely and unlimitedly performed both in the clockwise direction and the counterclockwise direction.

In addition, a reference position in the pan direction is decided for the pan mechanism of the camera platform 10.

Here, as shown in FIG. 4, the pan reference position is set to 0° (360°), and the rotation position of the main body 11 along the pan direction, that is, a pan position (pan angle) is expressed as 0° to 360°.

In addition, a basic movement of the camera platform 10 in the tilt direction is as follows.

As shown in FIGS. 5A and 5B, the movement in the tilt direction is realized when the camera pedestal 12 swings in both directions of an angle of elevation and an angle of depression with a rotary shaft 12a as the center of rotation.

Here, FIG. 5A shows a state where the camera pedestal 12 is located at the tilt reference position Y0 (0°). In this state, an imaging direction F1 matched with the imaging optical axis of the lens section 21a (optical system section) is parallel to the ground plane GR to which the ground base 15 is grounded.

First, in the direction of the angle of elevation, the camera pedestal 12 can move in a range from the tilt reference position Y0 (0°) to a predetermined maximum angle of rotation +f° with the rotary shaft 12a as the center of rotation, as shown in FIG. 5B. Moreover, also in the direction of the angle of depression, the camera pedestal 12 can move in a range from the tilt reference position Y0 (0°) to a predetermined maximum angle of rotation −g° with the rotary shaft 12a as the center of rotation.

Thus, the camera pedestal 12 moves in a range of the maximum angle of rotation +f° to the maximum angle of rotation −g° with the tilt reference position Y0 (0°) as a base point. In this way, the imaging field of view in the tilt direction (up and down directions) of the digital still camera 1 fixed to the camera platform 10 (camera pedestal 12) can be changed. That is, a tilt operation is realized.

Figure 6:
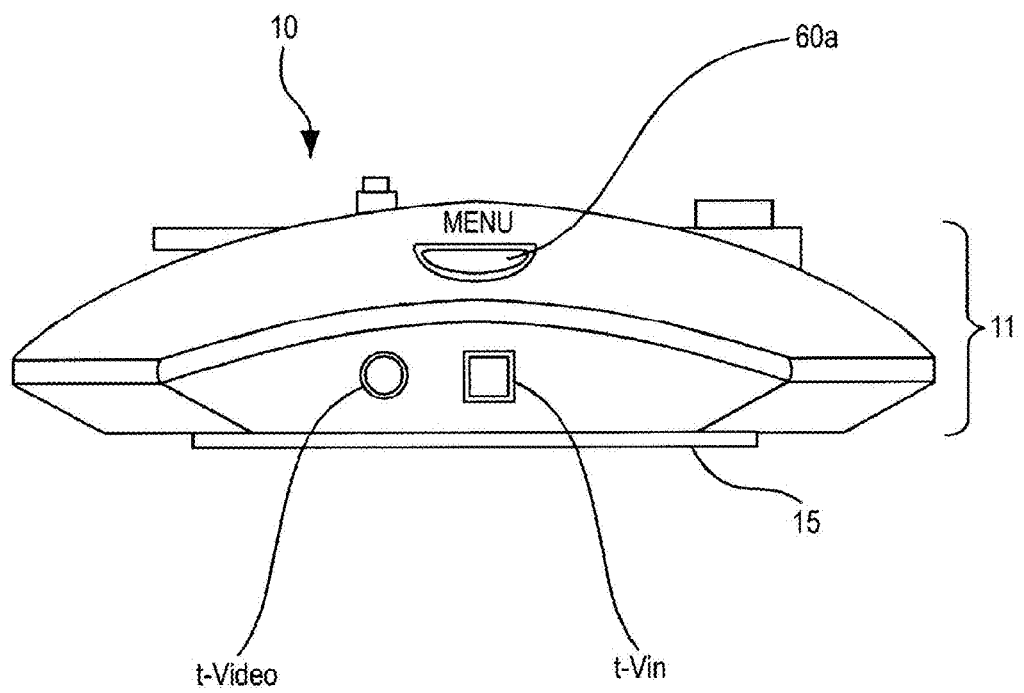
FIG. 6 is a back view of the camera platform of the embodiment.

FIG. 6 shows a back view of the camera platform 10.

As shown in FIG. 6, in the camera platform 10, a power supply terminal t-Vin to which a power cable is detachably connected and a video terminal t-Video to which a video cable is detachably connected are formed at the back surface section of the main body 11.

The camera platform 10 supplies electric power, which is input through the power supply terminal t-Vin, to the digital still camera 1 fixed to the camera pedestal 12 so that the digital still camera 1 is electrically charged.

That is, the camera platform 10 in this example also functions as a cradle (dock) for electrically charging the digital still camera 1.

Moreover, in this example, when an image signal based on a captured image is transmitted from the digital still camera 1, the camera platform 10 outputs the image signal to the outside through the video terminal t-Video.

In addition, as shown in FIG. 4 or 6, a menu button 60a is provided at the back surface section of the main body 11 of the camera platform 10. By operation of the menu button, menu display is performed, for example, on the display screen section 33a of the digital still camera 1 through communication between the camera platform 10 and the digital still camera 1. Using this menu display, the user can perform a necessary operation.

[1-2: Digital Still Camera]

Figure 7:
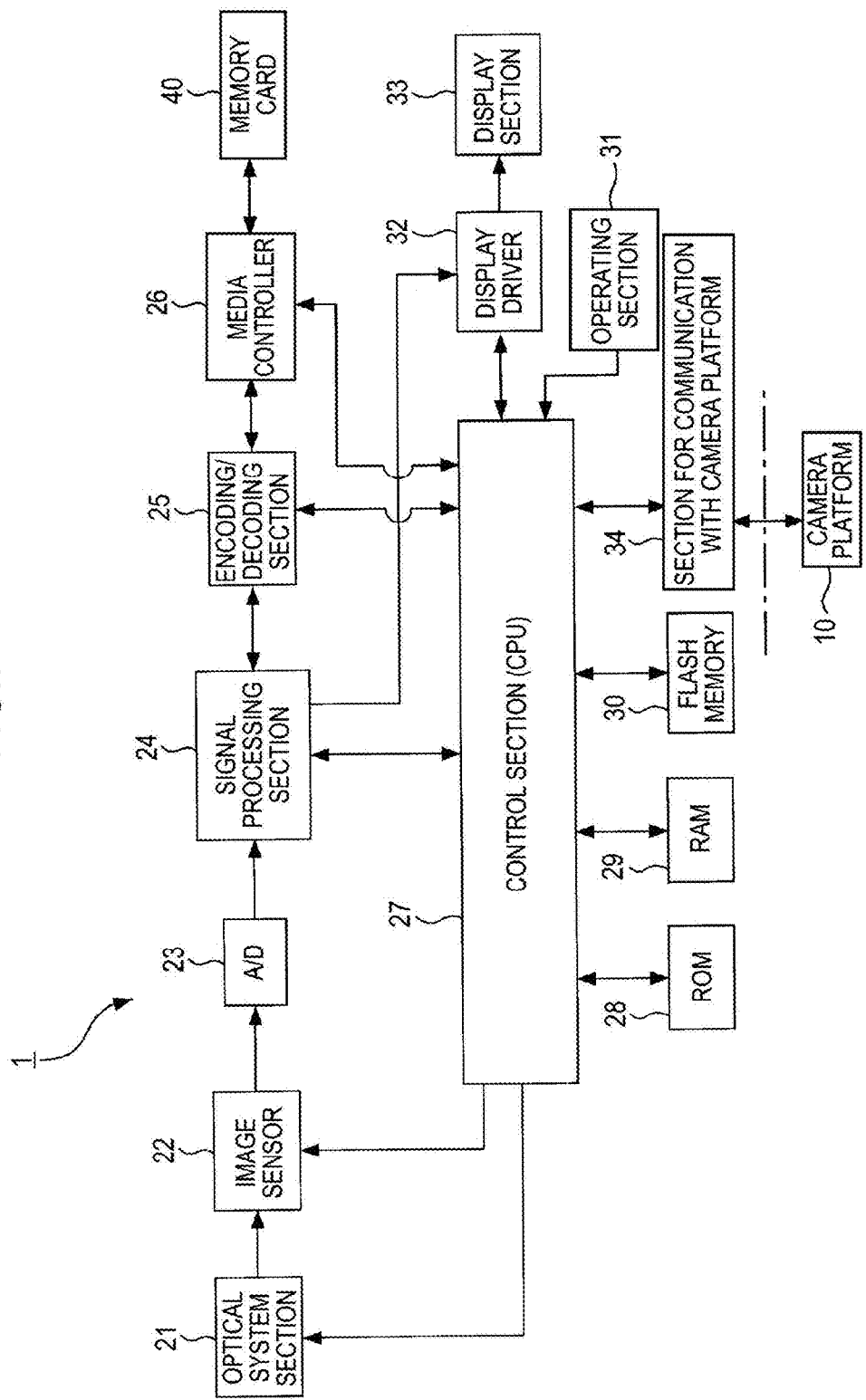
FIG. 7 is a block diagram showing an example of the internal configuration of the digital still camera of the embodiment.

FIG. 7 is a block diagram showing an example of the internal configuration of the digital still camera 1.

An optical system section 21 includes an imaging lens group including a zoom lens and a focus lens in a predetermined number, a diaphragm, and the like and forms incident light on the light receiving surface of an image sensor 22 as imaging light.

In addition, the optical system section 21 also includes a driving mechanism for driving the zoom lens, the focus lens, the diaphragm, and the like. The operation of the driving mechanism is controlled by so-called camera control, such as zoom (angle of view) control, automatic focusing adjustment control, and automatic exposure control, which is executed by a control section 27.

The image sensor 22 performs so-called photoelectric conversion in order to convert imaging light obtained by the optical system section 21 into an electric signal. For this reason, the image sensor 22 receives the imaging light from the optical system section 21 on the light receiving surface of a photoelectric conversion device and outputs signal charges accumulated according to the intensity of the received light sequentially at predetermined timing. As a result, an electric signal (imaging signal) corresponding to the imaging light is output.

In addition, a photoelectric conversion device (imaging device) adopted as the image sensor 22 is not particularly limited. For example, a CMOS (Complementary Metal Oxide Semiconductor) sensor or a CCD (Charge Coupled Device) may be mentioned in the current situation. Moreover, when the CMOS sensor is adopted, an analog-digital converter equivalent to an A/D converter 23, which will be described below, may be included as a device (component) equivalent to the image sensor 22.

The imaging signal output from the image sensor 22 is input to the A/D converter 23 so as to be converted into a digital signal and then input to a signal processing section 24.

The signal processing section 24 is formed by a DSP (Digital Signal Processor), for example, and performs predetermined signal processing on the digital imaging signal output from the A/D converter 23 according to a program.

The signal processing section 24 receives the digital imaging signal output from the A/D converter 23 in a unit equivalent to one still image (frame image). Then, predetermined signal processing is performed on the received imaging signal in units of a still image in order to create the captured image data (captured still image data) which is the image signal data equivalent to one still image.

In addition, the signal processing section 24 may execute image analysis processing for subject detection processing or composition processing, which will be described later, using the captured image data acquired as described above.

In order to record the captured image data created by the signal processing section 24 in a memory card 40 which is a recording medium, for example, the captured image data corresponding to one still image is output from the signal processing section 24 to an encoding/decoding section 25.

The encoding/decoding section 25 executes compression encoding on the captured image data in units of a still image, which is output from the signal processing section 24, using a predetermined still image compression encoding method. Then, the encoding/decoding section 25 adds a header or the like according to control of the control section 27, for example, and converts it into a format of image data compressed in a predetermined format. Then, the encoding/decoding section 25 transmits the image data created as described above to a media controller 26.

The media controller 26 writes and records the transmitted image data in the memory card 40 according to control of the control section 27. For example, the memory card 40 in this case is a recording medium with a configuration which has a card type profile shape based on the predetermined specification and includes a nonvolatile semiconductor memory device, such as a flash memory, thereinside.

In addition, the recording medium which records the image data may be formed as a type or format other than the above-described memory card. For example, various kinds of recording media involving an optical disc, a hard disk, and semiconductor memory chips, such as a flash memory chip which is detachably fixed, and a hologram memory may also be adopted.

In addition, the digital still camera 1 can display a so-called through image, which is an image that is being currently imaged, by making a display section 33 execute image display using the captured image data obtained by the signal processing section 24.

For example, the signal processing section 24 receives the imaging signal output from the A/D converter 23 and creates the captured image data corresponding to one still image, and repeats this operation to sequentially create the captured image data equivalent to a frame image in a moving image. Then, the signal processing section 24 transmits the captured image data, which is sequentially created as described above, to a display driver 32 according to control of the control section 27.

The display driver 32 creates a driving signal for driving the display section 33 on the basis of the captured image data input from the signal processing section 24 as described above and outputs it to the display section 33. As a result, images based on the captured image data in units of a still image are sequentially displayed on the display section 33.

If a user observes this, an image captured at that time is displayed as a moving image on the display section 33. That is, a through image is displayed.

In addition, the digital still camera 1 may reproduce the image data recorded in the memory card 40 and display the image on the display section 33.

In this case, the control section 27 designates the image data and directs the media controller 26 to read the data from the memory card 40. In response to this command, the media controller 26 accesses an address on the memory card 40, in which the designated image data is recorded, to execute the data reading and transmits the read data to the encoding/decoding section 25.

The encoding/decoding section 25 acquires the captured image data corresponding to one still image by extracting the entity data as compressed still image data from the captured image data transmitted from the media controller 26 and executing decoding processing, which is the opposite processing of the compression encoding, for the compressed still image data according to control of the control section 27, for example. Then, the captured image data is transmitted to the display driver 32. As a result, an image of the captured image data recorded in the memory card 40 is reproduced and displayed on the display section 33.

In addition, on the display section 33, a user interface image (operation image) may also be displayed together with the through image or the reproduced image of image data.

In this case, for example, according to the operating state at that time, the control section 27 creates the image data for display as a necessary user interface image and outputs it to the display driver 32. As a result, a user interface image is displayed on the display section 33.

In addition, the user interface image may be displayed separately from a monitor image or a reproduced image of the captured image data on the display screen of the display section 33 like a specific menu screen, for example. In addition, the user interface image may be displayed so as to overlap or to be mixed in a part on the monitor image or the reproduced image of the captured image data.

The control section 27 includes a CPU (Central Processing Unit) and forms a microcomputer together with a ROM 28, a RAM 29, and the like.

For example, not only a program executed by a CPU as the control section 27 but also various kinds of setup information and the like relevant to the operation of the digital still camera 1 are stored in the ROM 28.

The RAM 29 is a main memory for the CPU.

In addition, a flash memory 30 in this case is provided as a nonvolatile storage region used to store various kinds of setup information which may be changed (rewritten) according to a user's operation or operation history, for example.

Moreover, for example, when nonvolatile memories including a flash memory are adopted for the ROM 28, a part of the storage region in the ROM 28 may be used instead of the flash memory 30.

In the present embodiment, the control section 27 performs various kinds of imaging preparation processing for automatic imaging.

First, as subject detection processing, the control section 27 executes subject detection (or makes the signal processing section 24 execute subject detection) from each frame image, which is acquired by the signal processing section 24, while changing the imaging field of view, and performs processing for searching for a subject around the digital still camera 1. The subject detection is processing of detecting a predetermined target subject, for example, an image of a face.

In addition, optimal composition determination for determining optimal composition, which corresponds to the state of a subject detected by subject detection, according to predetermined algorithm and composition adjustment for setting the optimal composition acquired by the optimal composition determination as target composition are performed as composition processing. After the imaging preparation processing, the control section 27 performs control and processing for automatic recording of the captured image.

The control processing will be described later.

An operating section 31 indicates various kinds of controls, which are provided in the digital still camera 1, and an operation information signal output section, which creates an operation information signal according to the operation performed on the controls and outputs it to the control section 27, collectively.

As the controls, there are the release button 31a and various kinds of controls 31b (a power button, a mode button, a zoom operation button, an operation dial, and the like) shown in FIG. 1B.

Moreover, when the display section 33 is formed as a touch panel, the touch sensor section is also one specific example of the operating section 31.

In addition, a section which receives a command signal from a remote controller is also one example of the operating section 31.

The control section 27 executes predetermined processing according to the operation information signal input from the operating section 31. As a result, an operation of the digital still camera 1 according to a user's operation is executed.

A section for communication with a camera platform 34 executes communication between the camera platform 10 and the digital still camera 1 according to a predetermined communication method.

For example, in a state where the digital still camera 1 is fixed to the camera platform 10, the section for communication with a camera platform 34 has a physical layer configuration for making it possible to transmit or receive a communication signal to or from a communication section of the camera platform 10 and a configuration for realizing communication processing corresponding to a predetermined layer which is a higher layer than the physical layer. In FIG. 2, a connector portion connected to the connector 14 is included as the physical layer configuration.

Moreover, in order to make electric charging possible from the side of the camera platform 10, not only a terminal for transmission and reception of a communication signal but also a terminal for transmission of charging power is provided in each connector. Although not shown in the drawing, a battery mounting section in which a battery is detachably mounted is provided in the digital still camera 1, so that electric charging based on the electric power transmitted from the camera platform 10 side is performed for the battery mounted in the mounting section.

[1-3: Camera Platform]

Figure 8:
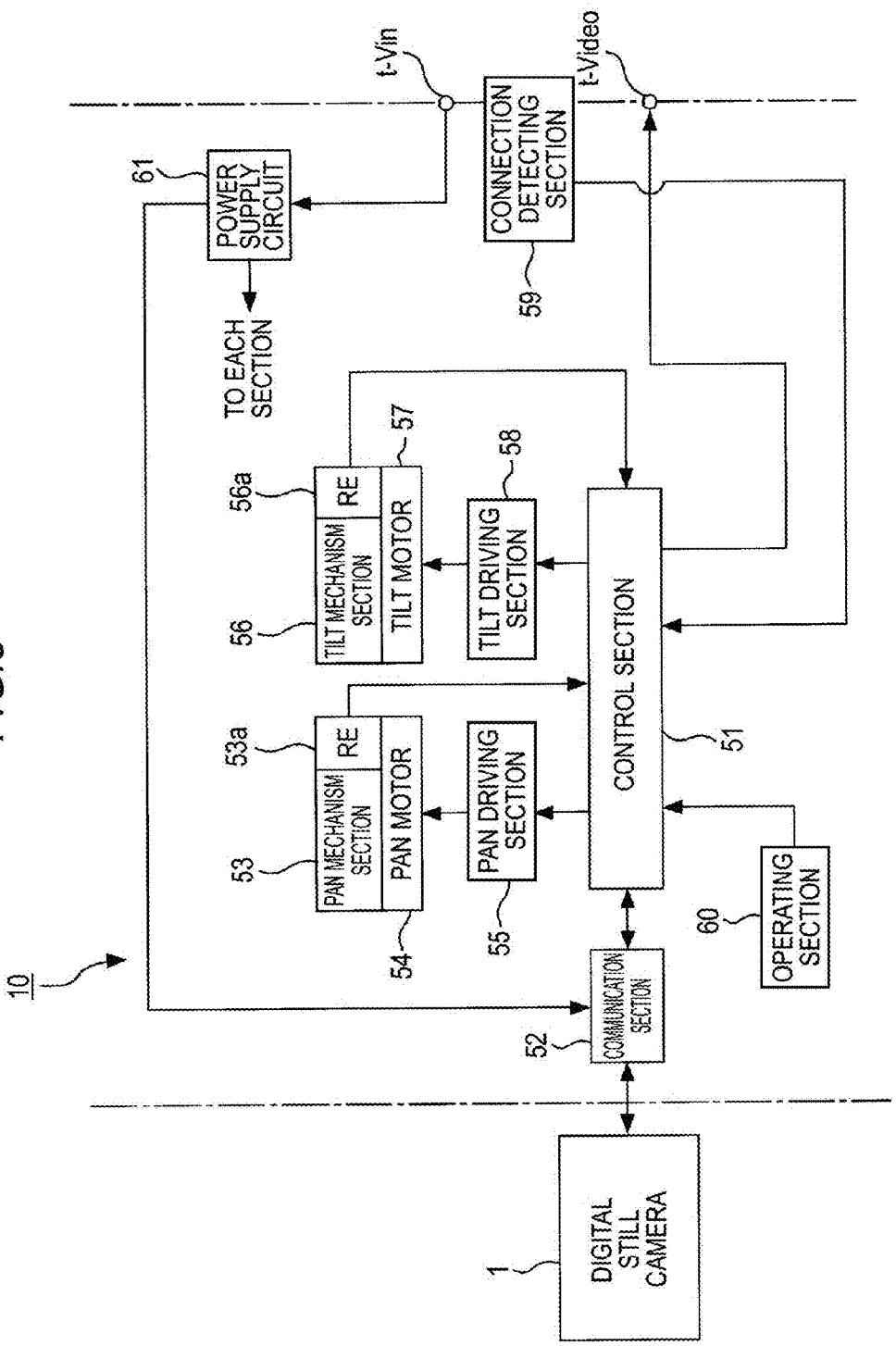
FIG. 8 is a block diagram showing an example of the internal configuration of the camera platform of the embodiment.

FIG. 8 shows an example of the internal configuration of the camera platform 10.

As shown in FIG. 6, the power supply terminal t-Vin and the video terminal t-Video are provided in the camera platform 10.

Electric power input through the power supply terminal t-Vin is supplied to a power supply circuit 61 and is then supplied as operating power for each necessary section in the camera platform 10. In addition, the power supply circuit 61 generates charging power for the digital still camera 1, and the charging power is supplied to the digital still camera 1 through a communication section 52 (connector).

In addition, the image signal transmitted from the digital still camera 1 is supplied to the video terminal t-Video through the communication section 52 and a control section 51.

In addition, although FIG. 8 shows that operating power for each section of the camera platform 10 is supplied only through the power input terminal t-Vin, a battery mounting section is actually provided in the camera platform 10 so that the operating power for each section can be supplied from a battery mounted in the mounting section.

In addition, a connection detecting section 59 for detecting whether or not a cable is connected to the power supply terminal t-Vin and the video terminal t-Video is provided in the camera platform 10. Regarding a specific configuration of a detection mechanism for detecting whether or not a cable is connected, for example, a configuration in which a switch turns on and off according to connection and disconnection of a cable may be mentioned. Any thing configured to output a detection signal for distinguishing the connection and disconnection of a cable may be used as the connection detecting section 59, and the specific configuration is not particularly limited.

A detection signal (detection signal regarding the power supply terminal t-Vin and detection signal regarding video terminal t-Video) of the connection detecting section 59 is supplied to the control section 51.

In addition, the camera platform 10 has a pan and tilt mechanism as described previously. As sections corresponding to this mechanism, FIG. 8 shows a pan mechanism section 53, a pan motor 54, a tilt mechanism section 56, and a tilt motor 57.

The pan mechanism section 53 has a mechanism for moving the digital still camera 1 fixed to the camera platform 10 in the pan (horizontal or left and right) direction shown in FIG. 4. The movement of this mechanism is made by forward or backward rotation of the pan motor 54.

Similarly, the tilt mechanism section 56 has a mechanism for moving the digital still camera 1 fixed to the camera platform 10 in the tilt (vertical or up and down) direction shown in FIGS. 5A and 5B. The movement of this mechanism is made by forward or backward rotation of the tilt motor 57.

The control section 51 is a microcomputer formed by the combination of a CPU, a ROM, a RAM, and the like, for example, and controls movements of the pan mechanism section 53 and the tilt mechanism section 56.

For example, when controlling the movement of the pan mechanism section 53, the control section 51 outputs a signal, which instructs the movement direction and the movement speed, to the pan driving section 55. The pan driving section 55 creates a motor driving signal corresponding to the input signal and outputs it to the pan motor 54. This motor driving signal is a pulse signal corresponding to PWM control if the motor is a stepping motor, for example.

By the motor driving signal, the pan motor 54 rotates in the necessary rotation direction and rotation speed, for example, and as a result, the pan mechanism section 53 is also driven to move in the movement direction and the movement speed corresponding thereto.

Similarly, when controlling the movement of the tilt mechanism section 56, the control section 51 outputs a signal, which instructs the movement direction and the movement speed necessary for the tilt mechanism section 56, to a tilt driving section 58. The tilt driving section 58 creates a motor driving signal corresponding to the input signal and outputs it to the tilt motor 57. Using the motor driving signal, the tilt motor 57 rotates in the necessary rotation direction and rotation speed, for example and as a result, the tilt mechanism section 56 is also driven in order to move in the movement direction and the movement speed corresponding thereto.

Here, the pan mechanism section 53 includes a rotary encoder (rotation detector) 53a. The rotary encoder 53a outputs a detection signal, which indicates the amount of rotation angle, to the control section 51 corresponding to the rotational movement of the pan mechanism section 53. Similarly, the tilt mechanism section 56 includes a rotary encoder 56*a*. The rotary encoder 56*a* also outputs a signal, which indicates the amount of rotation angle, to the control section 51 corresponding to the rotational movement of the tilt mechanism section 56.

Thus, the control section 51 can acquire (monitor) the information regarding the amount of rotation angle of the pan mechanism section 53 and the tilt mechanism section 56, which are being driven, in real-time manner.

The communication section 52 executes communication with the section for communication with a camera platform 34 in the digital still camera 1, which is fixed to the camera platform 10, according to a predetermined communication method.

Similar to the section for communication with a camera platform 34, the communication section 52 has a physical layer configuration for making it possible to transmit or receive a communication signal to or from a communication section at another party wirelessly or by cable and a configuration for realizing communication processing corresponding to a predetermined layer which is a higher layer than the physical layer. In FIG. 2, the connector 14 of the camera pedestal 12 is included as the physical layer configuration.

Specifically, an operating section 60 indicates controls as the menu button 60*a*, which is shown in FIG. 4 or 6, and an operation information signal output section, which creates an operation information signal according to the operation performed on the controls and outputs it to the control section 51, collectively. The control section 51 executes predetermined processing according to the operation information signal input from the operating section 60.

In addition, when a remote controller is prepared for the camera platform 10, a section which receives a command signal from the remote controller is also one example of the operating section 60.

<2. Example of Functional Configuration>

Figure 9:
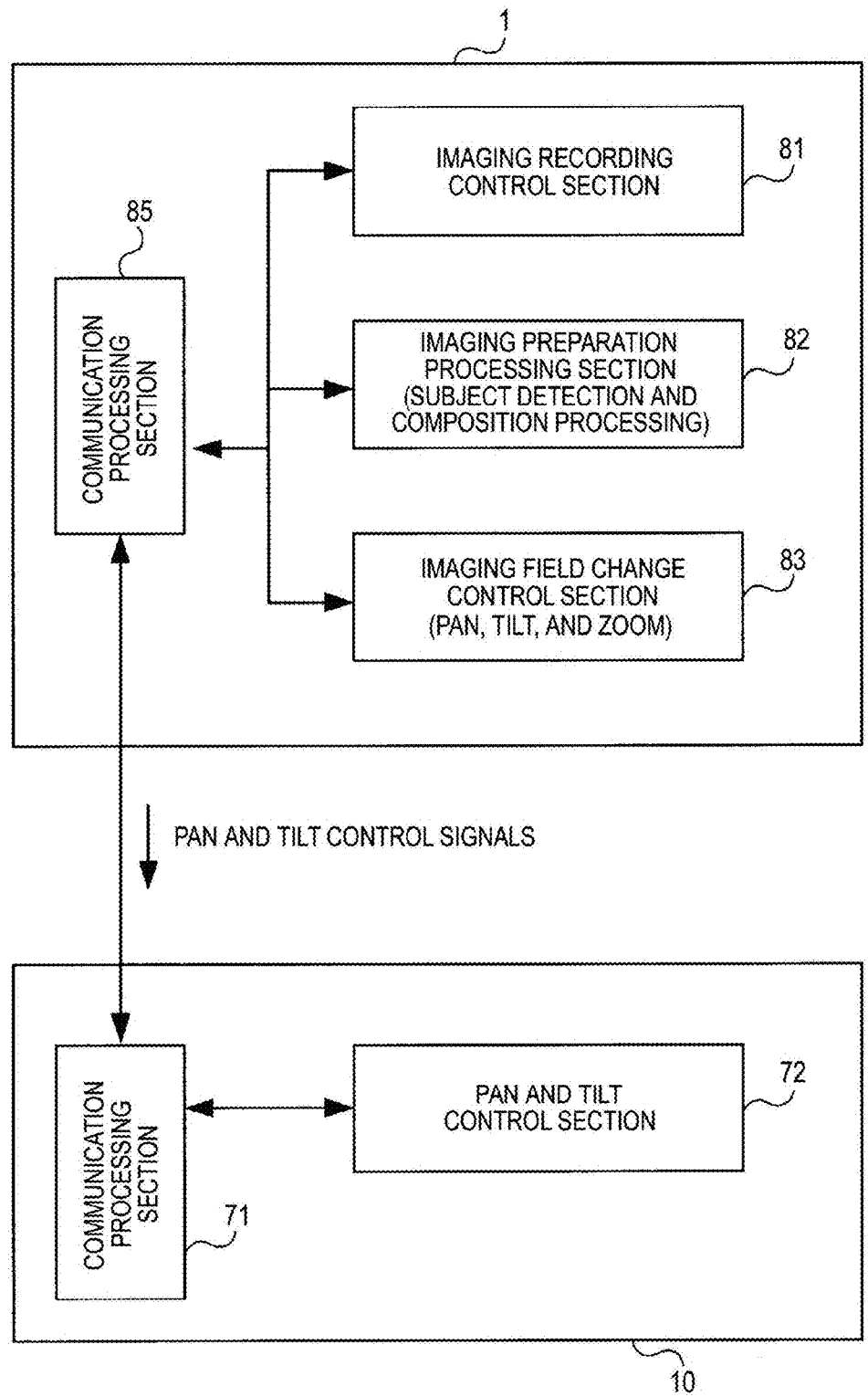
FIG. 9 is an explanatory view of an example of the control function configuration of the embodiment.

Next, FIG. 9 is a block diagram showing an example of the functional configuration, which is realized by hardware and software (program), regarding the digital still camera 1 and the camera platform 10 of the present embodiment.

This example of the functional configuration is a configuration for realizing an imaging control device which performs imaging operation control of the imaging system of this example, and mainly indicates a control processing function realized by associating the hardware configuration, such as the control section 27 in the digital still camera 1 and the control section 51 in the camera platform 10, with a software module run in them.

Especially, FIG. 9 shows control functions necessary for automatic still image capture processing, which will be described later, in blocks for each function.

As shown in FIG. 9, the digital still camera 1 (control section 27) includes an imaging recording control section 81, an imaging preparation processing section 82, an imaging field change control section 83, and a communication processing section 85.

In addition, the camera platform 10 (control section 51) includes a communication processing section 71 and a pan and tilt control section 72, for example.

First, in the digital still camera 1, the imaging recording control section 81 acquires an image, which is obtained by imaging, as data (captured image data) of an image signal and executes control processing for storing the captured image data in a recording medium. In addition, the imaging recording control section 81 also performs control for reproduction of the recorded still image data, display operation, or display operation of a through image at the time of imaging.

That is, the imaging recording control section 81 controls the optical system section 21, the image sensor 22, the A/D converter 23, the signal processing section 24, the encoding/decoding section 25, the media controller 26, the display driver 32, and the like shown in FIG. 7. That is, the imaging recording control section 81 is a functional section which controls the basic operation of the digital still camera 1, such as instructing lens driving control of the optical system section 21, imaging operation of the image sensor 22, imaging signal processing, and recording and reproduction processing and executing still image capturing.

The imaging preparation processing section 82 is a functional section which performs imaging preparation processing when executing automatic still image capturing (automatic still image capturing to be described later) which does not depend on a user's release operation.

One example of the imaging preparation processing is subject detection processing. This is a processing of checking each frame image obtained by the signal processing section 24 while executing pan and tilt operations using the camera platform 10 so that a subject (for example, a person's face) falls within the imaging field of view. In order to do so, the imaging preparation processing section 82 performs processing for determination of necessary pan and tilt operations of the camera platform 10, person detection and face detection based on image analysis of frame image data, and the like.

In addition, another example of the imaging preparation processing is composition processing. The composition processing is a processing of determining whether or not the arrangement of a subject image within the imaging field of view is in the optimal state (composition determination) and of adjusting the composition (composition adjustment). In order to adjust the composition, the imaging preparation processing section 82 performs determination of necessary pan and tilt operations of the camera platform 10, determination of zoom lens driving in the optical system section 21, and the like.

In addition, a processing function of performing image analysis for the subject detection processing or the composition processing described above may also be executed by a DSP (Digital signal Processor) as the signal processing section 24 instead of the control section 27. Therefore, a functional section as the imaging preparation processing section 82 can be realized by a program and an instruction given to one or both of the control section 27 and a DSP as the signal processing section 24.

The imaging field change control section 83 is a functional section which controls an operation of actually changing an imaging field of view. The change of imaging field of view is performed by panning and tilting of the camera platform 10 or by zoom operation of the optical system section 21. Therefore, the imaging field change control section 83 serves as a functional section which performs pan and tilt control and zoom control.

When a cameraman performs imaging manually using the digital still camera 1, the imaging field change control section 83 controls zoom lens driving, for example, according to the cameraman's zoom operation.

Moreover, when performing automatic still image capturing, the imaging field change control section 83 performs zoom driving control, pan driving control, and tilt driving control according to determination and instruction of the imaging preparation processing section 82.

For the pan driving control and the tilt driving control, pan and tilt control signals are transmitted to the camera platform 10 through the communication processing section 85.

For example, when performing composition adjustment or the like, the imaging field change control section 83 outputs, according to the amounts of movement of pan and tilt determined by the imaging preparation processing section 82, pan and tilt control signals instructing the amounts of movement to the camera platform 10.

In addition, the imaging field change control section 83 performs driving control of the zoom operation of the optical system section 21 according to the zoom magnification determined by the imaging preparation processing section 82.

The communication processing section 85 executes communication with a communication processing section 71, which is provided in the camera platform 10, according to a predetermined communication protocol.

The pan and tilt control signals generated by the imaging field change control section 83 are transmitted to the communication processing section 71 of the camera platform 10 by communication using a communication processing section 64.

In the present embodiment, the imaging preparation processing section 82 is equivalent to a subject detecting section described in the appended claims.

In addition, the imaging field change control section 83 is equivalent to an imaging field change control section described in the appended claims.

Then, in the camera platform 10 in the functional configuration shown in FIG. 9, the communication processing section 71 executes communication with a communication processing section 85 in the digital still camera 1.

If the pan and tilt control signals are received, the pan and tilt control signals are output to the pan and tilt control section 72.

The pan and tilt control section 72 functions to execute processing regarding pan and tilt control of the control processing executed by the control section 51 of the camera platform 10 shown in FIG. 8, for example.

The pan and tilt control section 72 controls the pan driving section 55 and the tilt driving section 58 shown in FIG. 8 according to the input pan and tilt control signals. In this way, panning and tilting for panorama imaging or subject detection processing, panning and tilting for obtaining the optimal horizontal viewing angle and vertical viewing angle by composition processing, and the like are performed, for example.

In addition, although the respective control function sections are shown as blocks in FIG. 9, they do not have to be formed as separate program modules or separate hardware. In practice, it is preferable that a processing operation, which will be described below, is realized as overall processing of the control function sections.

<3. Example of Subject Search Operation>

Here, an example of search operation for performing subject detection, for example, detection of a face image as a subject will be described.

The imaging system of the present embodiment which includes the digital still camera 1 and the camera platform 10 detects a subject in the neighborhood, such as a person's face, by performing a subject search automatically by movement based on pan, tilt, and zoom. Then, if a subject is detected, composition for the detected subject is automatically set and then imaging recording is performed.

In such automatic imaging and recording operations, it is necessary to consider what kind of search (subject search) behavior should be made when executing a subject search, that is, it is necessary to consider what kind of movement pattern of the imaging direction (imaging optical axis) in panning and tilting should be set.

In this example, a clockwise operation indicated as a first search rotation direction RT1 and a counterclockwise operation indicated as a second search rotation direction TR2, which are shown in FIG. 4, are performed as movements in the pan direction. In addition, an operation in the direction of an angle of depression (direction of $-g°$) and an operation in the direction of an angle of elevation (direction of $+f°$), which are shown in FIG. 5B, are performed as movements in the tilt direction.

These operations are executed in predetermined order, such that a movement based on a predetermined search pattern is realized.

Figure 10:
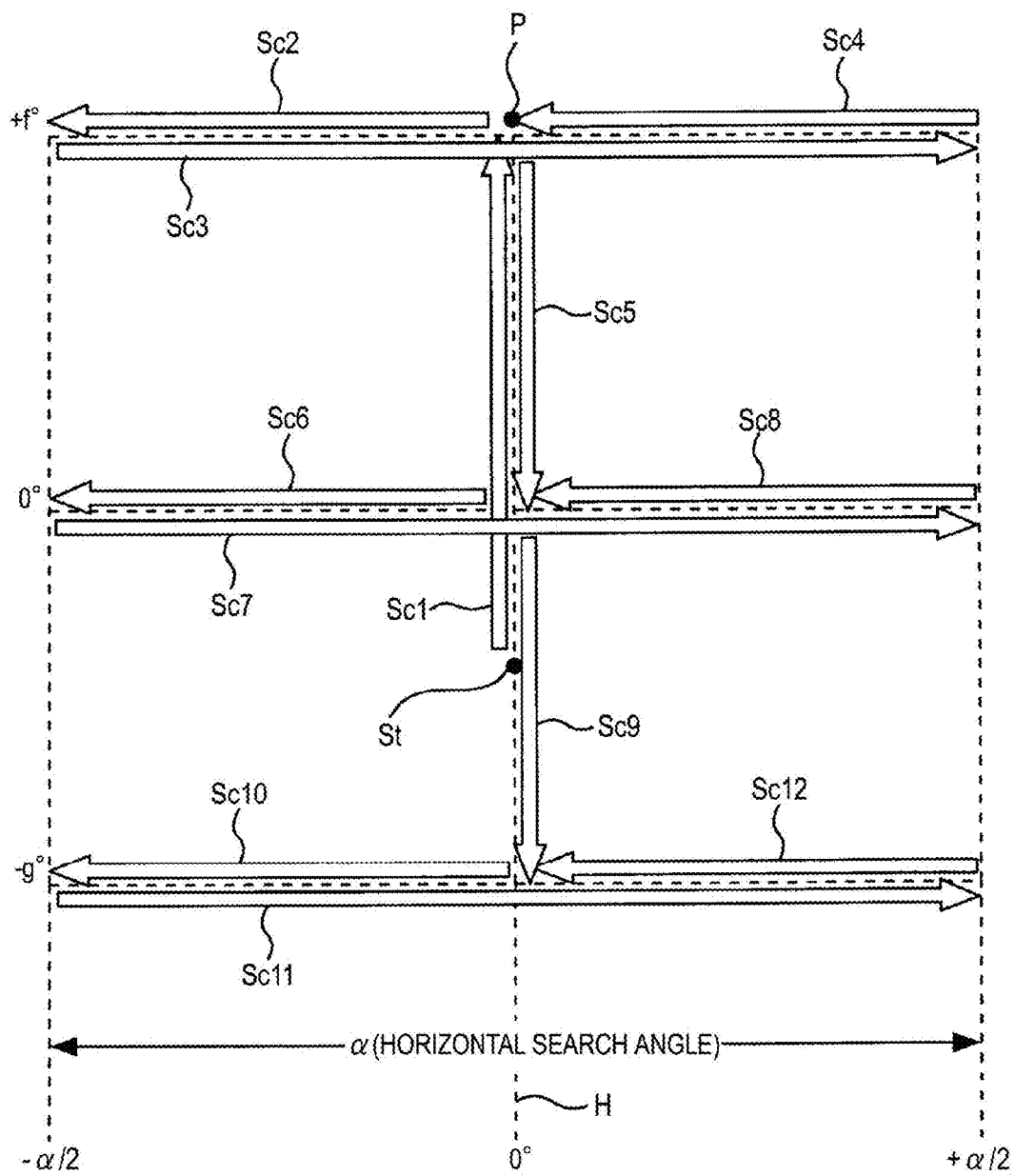
FIG. 10 is an explanatory view of a search operation of the embodiment.

Here, an example will be described in which a subject search operation of drawing a figure shown in FIG. 10 is performed.

Figure 14:
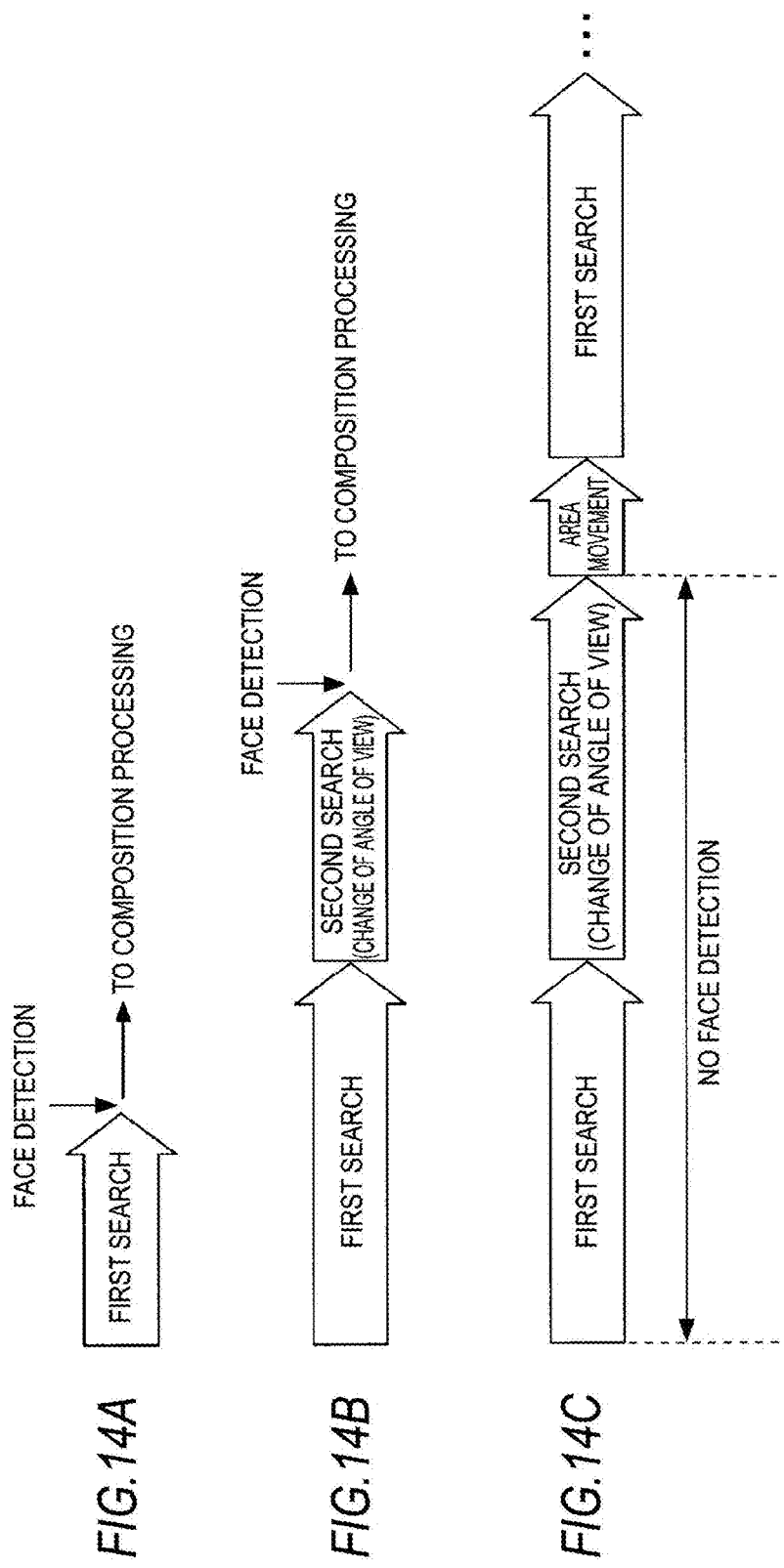
FIGS. 14A to 14C are explanatory views of a subject detection operation in the first processing example of the embodiment.

When performing a subject search, a horizontal search angle $\alpha$ is first set. Although the horizontal search angle $\alpha$ may be arbitrarily set, the horizontal search angle $\alpha$ is set to 90° when performing a search in a state where the surroundings of 360° are divided into four areas (search ranges) as shown in FIGS. 14A to 14C which will be described later.

Moreover, in the search pattern shown in FIG. 10, the middle position in the horizontal search angle $\alpha$ is treated as a horizontal center position H. Assuming that the horizontal center position H is 0°, a movable range in the pan direction is expressed as $+\alpha/2°\sim-\alpha/2$.

The search pattern shown in FIG. 10 is as follows.

It is assumed that a search for subject detection starts in a state of a certain pan position and tilt position corresponding to the starting point St.

Then, the camera platform 10 moves from the position of the starting point St to the tilt position $+f°$ only for the tilt direction while maintaining the pan position as indicated by the arrow Sc1. The tilt position $+f°$ at the pan position corresponding to the starting point St is a search origin P.

If the camera platform 10 reaches the search origin P, the camera platform 10 performs panning for movement from the horizontal center position H (0°) to $-2/\alpha°$ as a movement in the pan direction while maintaining the tilt position $+f°$, as indicated by the arrow Sc2. Then, the camera platform 10 performs panning for movement from the pan position $-2/\alpha°$ to the pan position $+2/\alpha°$, which is a limit on the other side, while maintaining the tilt position $+f°$, as indicated by the arrow Sc3.

Then, the camera platform 10 performs panning from the pan position $+2/\alpha$ to the horizontal center position H (0°) while maintaining the tilt position $+f°$.

When the horizontal search angle $\alpha$ is set to 90°, the operation indicated by the arrows Sc2 to Sc4 is as follows. First, the digital still camera 1 rotates counterclockwise (in the second search rotation direction TR2) by 45° from the horizontal center position in a state where the tilt position of $+f°$ is fixed. Then, the digital still camera 1 rotates clockwise (in the first search rotation direction TR1) by 90° and then rotates counterclockwise by 45° to return to the horizontal center position H.

Moreover, by the operation indicated by the arrows Sc2 to Sc4, the search in the pan direction in a state where the imaging direction F1 is an upward tilt position $+f°$ is first completed.

Then, the camera platform 10 performs tilting for movement from the tilt position $+f°$ to the tilt position 0° while maintaining the horizontal center position H (0°) as indicated by the arrow Sc5. As a result, the imaging direction F1 turns to the middle (horizontal level) in the up and down directions.

Then, as indicated by the arrows Sc6, Sc7, and Sc8, the camera platform 10 performs the same panning as indicated by the arrows Sc2, Sc3, and Sc4. Thus, a search equivalent to one round trip in the pan direction in a state where the imaging direction F1 turns to the middle (horizontal level) in the up and down directions is completed.

Then, the camera platform 10 performs tilting for movement from the tilt position 0° to the tilt position −g° while maintaining the horizontal center position H (0°) as indicated by the arrow Sc9. As a result, the imaging direction F1 turns downward.

Then, as indicated by the arrows Sc10, Sc11 and Sc12, the camera platform 10 performs the same panning as indicated by the arrows Sc2, Sc3, and Sc4. Thus, a search equivalent to one round trip in the pan direction in a state where the imaging direction F1 turns downward is completed.

According to the search operation shown in FIG. 10, the following advantages are obtained.

First, in a search operation in the pan direction at each tilt position of three steps, the camera platform 10 makes one round trip within a predetermined rotation angle range in the pan direction. For example, although one-way search is also possible, a subject can be more reliably detected by performing the round-trip search operation.

Moreover, in the search pattern shown in FIG. 10, the pan position obtained at the start of subject search is set as a pan position of the search origin P as it is. This makes it possible to detect a subject quickly.

For example, it is assumed that the pan position of the camera platform 10, on which the digital still camera 1 is placed, is not a pan reference position. In addition, it is assumed that the camera platform 10 is replaced in this state and the subject search is started. In such a case, it can be said that a possibility that a user will set the imaging direction F1 of the digital still camera 1 to be almost suitable for himself or herself is high even if the user is not aware of it. Under such conditions, if the pan position of the camera platform 10 at the start of subject search is set as a pan position of the search origin P, a possibility that a user who replaced the camera platform 10 will be detected immediately is increased. That is, a possibility that a time until a face image or the like is detected first will be shortened is increased.

Moreover, in the above situation, it can be said that a possibility that a person as a subject will be present near the horizontal center position H corresponding to the search origin P is high at least for the pan direction. Therefore, when performing panning in order to change the imaging direction F1 in the vertical direction like the search pattern shown in FIG. 10, it is preferable to perform necessarily the panning at the horizontal center position H.

In addition, the inventor of this application studied some supposed situations. As a result, it was confirmed that a probability that a face of a person as a subject would be present within the image frame and be detected was high in the case of upward imaging direction.

As a general tendency, when a user places the camera platform 10 on which the digital still camera 1 is mounted for automatic imaging and recording, the location is a table surrounded by persons as subjects in many cases. In addition, if people as subjects are mostly standing, the tables or the like located approximately as high as the breast to the waist may be often used. That is, in relationship to the height, the face of a person as a subject tends to be higher than the digital still camera 1.

Therefore, in the search pattern shown in FIG. 10, for a search in the pan direction, the imaging direction is set upward first and then the search in the pan direction is performed, for example (Sc2, Sc3, and Sc4). Then, the same search is performed in order of middle (horizontal) (Sc6, Sc7, and Sc8) and bottom (Sc10, Sc11, and Sc12). That is, a search in a pan direction in a state where the tilt position is fixed is performed while changing the tilt position such that the imaging direction F1 changes from the upward state to the downward state in a sequential manner.

In this way, it is possible to detect a subject efficiently and as quickly as possible.

In addition, although the fixed tilt position is set to have three steps corresponding to +f°, 0°, and −g°, this is just an example. If the number of steps is 2 or more, the tilt position may be set to have the arbitrary number of steps in a range of +f° to −g°. In addition, a plurality of set tilt positions do not necessarily have to be separated by the same angle. For example, the upward tilt position may be set to have a smaller division angle than the downward tilt position. That is, different division angles may be set.

Next, as the subject search operation shown in FIG. 10, an operation of performing a search of the surroundings of 360° when the horizontal search angle α is 90° will be described.

Figure 11:
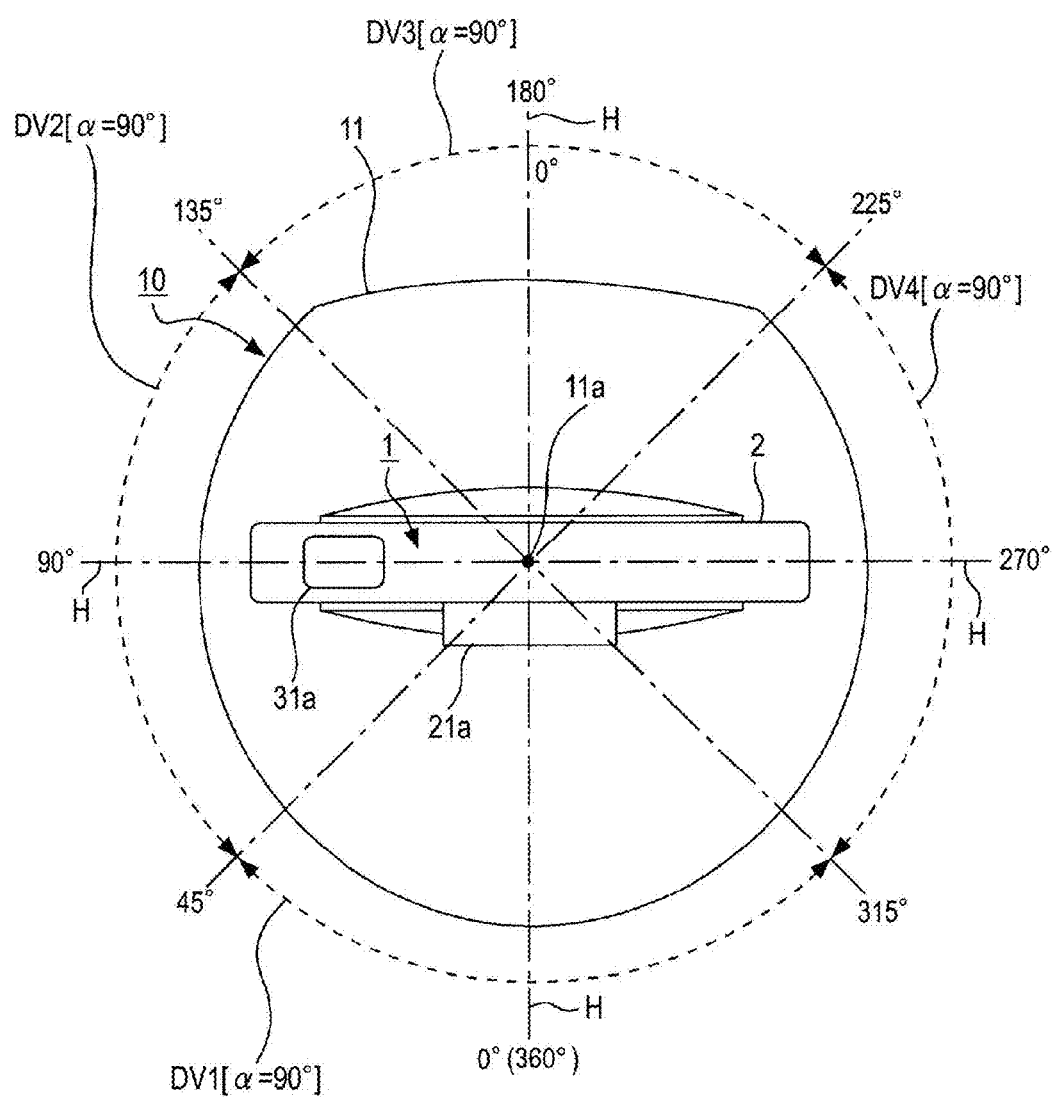
FIG. 11 is an explanatory view of the search area of the embodiment.

As shown in FIG. 11, the pan angle of 360° is divided into four partial search ranges (movable angle range in the pan direction) of first to fourth partial search ranges DV1 to DV4. Here, it is assumed that the four partial search ranges are divided to have the same angle. That is, the angle range in the pan direction that one partial search range has is 90°. In addition, the angle range of 90° in the pan direction that each of the first to fourth partial search ranges DV1 to DV4 has is equivalent to the horizontal search angle α.

The behavior of a subject search when the first to fourth partial search ranges DV1 to DV4 are set as shown in FIG. 11 is as follows.

First, the camera platform 10 executes the search pattern shown in FIG. 10 in the pan angle range of the first partial search range DV1. In this case, the horizontal center position H shown in FIG. 10 is set as a pan position 0° in FIG. 11. In addition, the pan position 45° corresponds to +α/2 in FIG. 10 and the pan position of 315° corresponds to −α/2. That is, the first partial search range DV1 in this case is set in the angle position range of pan position 315°~(0°)~−45°.

After executing the search operation shown in FIG. 10 in the first partial search range DV1, the camera platform 10 moves in the pan direction with the imaging direction F1 at the pan position of 90°. The pan position of +90° becomes the horizontal center position H in the pan angle range of the second partial search range DV2. Then, the camera platform 10 executes the search operation shown in FIG. 10 in the second partial search range DV2.

Then, the camera platform 10 moves up to the pan position of 180°, which is the horizontal center position H in the third partial search range DV3, and executes the search operation shown in FIG. 10 in the third partial search range DV3.

Then, the camera platform 10 moves up to the pan position of 270°, which is the horizontal center position H in the fourth partial search range DV4, and executes the search operation shown in FIG. 10 in the fourth partial search range DV4.

In this way, the search of the surroundings of 360° is executed. In the automatic imaging mode operation, such a 360° search operation is repeated.

<4. Automatic Still Image Capture Mode Processing>

Here, an operation in an automatic still image capture mode, which is possible in a state where the digital still camera 1 is mounted on the camera platform 10, will be described.

Figure 12:
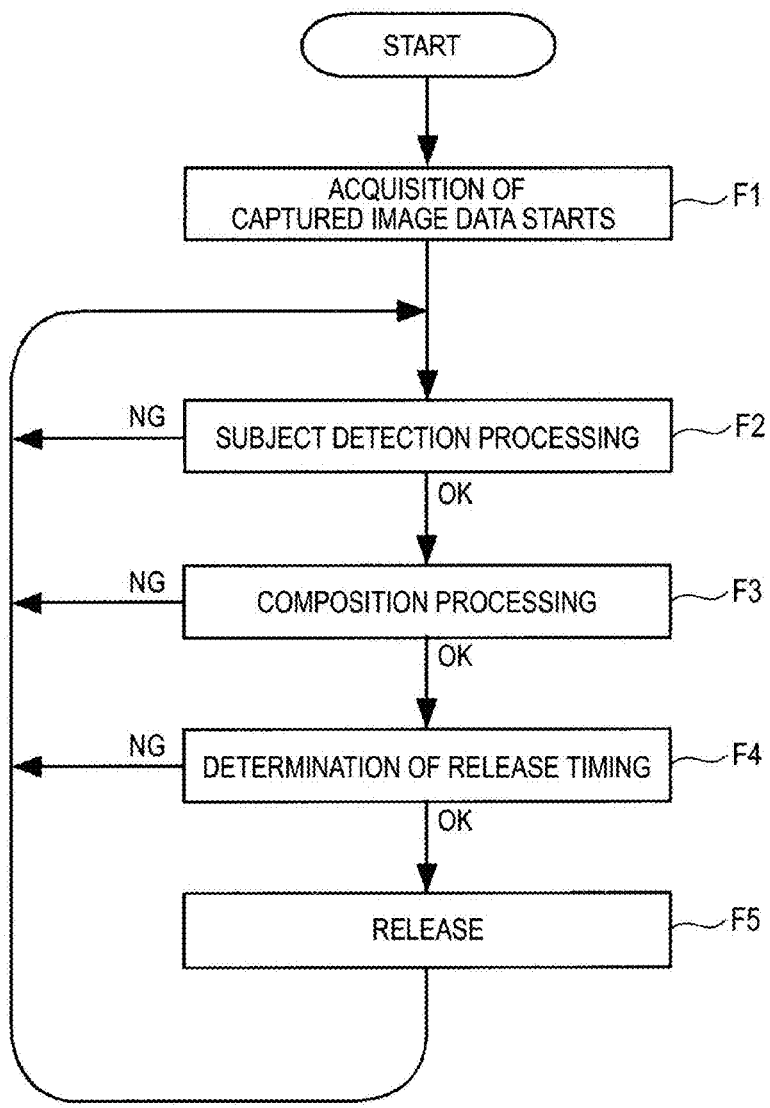
FIG. 12 is a flow chart of the automatic imaging processing of the embodiment.

FIG. 12 shows the procedure of automatic still image capture processing without a user's release operation.

In the automatic still image capture mode in which automatic still image capturing is performed, the imaging system in this example performs, as imaging preparation, an automatic composition adjustment operation of setting the optimal composition, which is determined according to the mode of a subject detected through subject detection, as target composition by each operation of subject detection (subject search), optimal composition determination, and composition adjustment. In addition, release processing is automatically performed under predetermined conditions. Thus, appropriate still image capturing is performed without an operation of a cameraman.

If an imaging operation in the automatic still image capture mode starts, acquisition of the captured image data starts in step F1 of FIG. 12.

That is, the imaging record control section 81 starts the acquisition of the captured image data from the image sensor 22 and the signal processing section 24 for each frame.

Subject detection processing is performed in step F2, and composition processing is performed in step F3.

The subject detection processing and the composition processing (optimal composition determination and composition adjustment) are executed by the function (specifically, processing of the control section 27 and/or the signal processing section 24) of the imaging preparation processing section 82. In addition, although the subject search described in FIGS. 10 and 11 is performed for subject detection, the operation is executed by the control function of the imaging field change control section 83 (control section 27) and the pan and tilt control section 72 (control section 51) of the camera platform.

After the acquisition of the captured image data starts in step F1, the signal processing section 24 acquires the frame image data equivalent to one still image sequentially as captured image data from the image sensor 22.

The imaging preparation processing section 82 performs processing of detecting an image section equivalent to a person's face from the frame image data as subject detection processing.

In addition, the subject detection processing may be executed for all frames or may be executed every predetermined number of frames set in advance.

In the subject detection processing in this example, a face frame is set corresponding to an image region of the face for each subject detected from an image using a so-called a face detection technique, for example. Then, the information regarding the number of subjects within the image frame and the size of each subject or the position of each subject within the image frame are acquired from the information including the number of the relevant face frames, the sizes, and the positions.

Moreover, several face detection techniques are known, and it is not particularly limited regarding which kind of detection technique is to be adopted in the present embodiment. It is preferable to adopt an appropriate method in consideration of detection precision, design difficulty, and the like.

As subject detection processing in step F2, a subject existing around the digital still camera 1 is searched for first.

Specifically, as a search for a subject, the control section 27 (imaging preparation processing section 82 and imaging field change control section 83) in the digital still camera 1 performs pan and tilt control for the camera platform 10 and zoom control for the optical system section 21. In this case, for example, subject detection based on the image analysis of the signal processing section 24 (or the control section 27) is executed while changing the imaging field of view. As an operation at this time, the subject search operation described in FIGS. 10 and 11 is executed.

Such a subject search is executed until a subject is detected on a frame image as the captured image data. Then, the subject search ends if the existence of a subject (person's face) within the frame image, that is, in the imaging field of view at that point in time is detected.

After the subject detection processing ends, the control section 27 (imaging preparation processing section 82) performs composition processing in step F3.

In the composition processing, first, it is determined whether or not the composition at that point in time is optimal. In this case, image structure determination (in this case, determination regarding the number of subjects, subject size, subject position, and the like within the image frame) is performed on the basis of a subject detection result. Then, on the basis of the information regarding the image structure determined through the image structure determination, the optimal composition is determined according to predetermined algorithm.

The composition in this case is determined by each imaging field of view of pan, tilt, and zoom. Therefore, depending on the processing for determination regarding whether or not it is the optimal composition, the information regarding the amount of control of pan, tilt, and zoom for setting to the optimal imaging field of view corresponding to the subject detection result (state of a subject within the image frame) is obtained as the determination result.

Then, if the composition is not in the optimal state, pan and tilt control and zoom control are performed as composition adjustment in order to realize the optimal composition state.

Specifically, the control section 27 (imaging preparation processing section 82 and imaging field change control section 83) transmits the information regarding the changed amount of control of pan and tilt, which has been acquired by the optimal composition determination processing, to the control section 51 of the camera platform 10 as the composition adjustment control.

In response to this, the control section 51 of the camera platform 10 calculates the amounts of movement of the pan mechanism section 53 and the tilt mechanism section 56, which correspond to the designated amount of control, and supplies control signals to the pan driving section 55 and the tilt driving section 58 so that pan driving and tilt driving corresponding to the amounts of movement are performed.

In addition, the control section 27 (imaging preparation processing section 82 and imaging field change control section 83) transmits the information regarding the angle of view in zoom, which has been acquired by the optimal composition determination processing, to the optical system section 21 in order to make the optical system section 21 execute a zoom operation so that the designated angle of view is acquired.

In addition, if it is determined not to be the optimal composition in the composition processing and pan, tilt, and zoom controls are performed as composition adjustment, the process returns from step F3 to the subject detection processing in step F2. This is because a subject may deviate from the imaging field of view by pan, tilt, and zoom operation or by movement of a person.

When the optimal composition is acquired, the control section 27 (imaging record control section 81) performs release timing determination processing in step F4.

In the release timing determination processing in step F4, a release timing may not be appropriately. In this case, the process starts again from the subject detection in step F1. This is because a subject may deviate from the imaging field of view by movement of a subject person or the like or the composition may be broken.

If it is determined that the release conditions are satisfied by the release timing determination processing, automatic recording of the captured image data is performed as release processing in step F5. Specifically, the control section 27 (imaging record control section 81) controls the encoding/decoding section 25 and the media controller 26 to record the captured image data (frame image), which is obtained at that point in time, in the memory card 40.

The release timing determination processing in step F4 is a processing of determining whether or not predetermined still image capturing conditions are satisfied in order to obtain an appropriate still image, and various kinds of examples may be considered.

For example, release timing determination based on a time may be considered. For example, the elapse of predetermined time (for example, 2 or 3 seconds) from the point in time at which composition processing is acceptable is set as still image capture conditions. In that case, the control section 27 (imaging record control section 81) counts a predetermined time in step F4 and executes release processing in step F5 after the predetermined time elapses.

In addition, when a specific subject state is determined from a captured image, it may be determined that the still image capture conditions are satisfied.

In step F4, the control section 27 (imaging record control section 81) monitors a specific subject state detected by analysis of the captured image.

As examples of the specific subject state, a subject captured in composition processing may give a specific look, such as a smiling face, or may make a specific gesture, such as waving a hand toward an imaging system, raising a hand, clapping, making a piece sign, and winking toward an imaging system. Alternatively, it may also be considered that a user as a subject gazes at the imaging system.

In step F4, the control section 27 determines a specific state of the user by image analysis processing for the captured image. Then, if a specific subject state is detected, the control section 27 determines that it is a release timing and executes release processing in step F5.

In addition, the digital still camera 1 may include a sound input section, and it may be determined that the still image capture conditions are satisfied when there is a specific sound input.

For example, a specific word, clapping sound, and whistle that a user makes may be set as specific sounds which serve as the still image capture conditions. In step F4, the control section 27 (imaging record control section 81) detects whether or not a specific sound has been input.

If such a specific sound is checked from an input sound signal analysis result of the sound input section, the control section 27 determines that it is a release timing and executes the release processing in step F5.

As described above with reference to FIG. 12, still image capturing in the automatic still image capture mode is realized on the basis of control and processing of the control section 27.

<5. Example of Subject Detection Processing in an Embodiment>

[5-1: First Processing Example]

As described above, the subject search described in FIGS. 10 and 11 for subject detection processing in step F2 of FIG. 12 is performed. In the present embodiment, however, a subject search is performed with a face as a target subject, for example. In this case, it is necessary to execute a search appropriately and efficiently. Therefore, a search is performed such that a subject can be caught as widely as possible by one search and a subject can be appropriately recognized even in the front depth direction.

Hereinafter, various examples of the subject detection processing in step F2 will be described.

A first processing example as the subject detection processing in step F2 will be described with reference to FIG. 13. This processing is a processing of the control section 27 which has a function shown in FIG. 9.

As described above, a subject search is performed first if the subject detection processing in step F2 starts. Accordingly, in step F101 of FIG. 13, the control section 27 sets the zoom lens of the optical system section 21 to the wide end. That is, this is to search for a subject widely in a state of a widest angle.

Then, the control section 27 starts a search operation in step F102. For example, the control section 27 sets the panning position at that point in time as the horizontal center H shown in FIG. 10. Then, the control section 27 starts an operation of the search pattern shown in FIG. 10, for example, in the first partial search range DV1 shown in FIG. 11.

That is, the control section 27 starts processing of transmitting pan and tilt control signals to the camera platform 10 in order to make the camera platform 10 execute a search in the search pattern shown in FIG. 10.

In addition, the control section 27 starts analysis processing of the captured image signal input to the signal processing section 24 while making the camera platform 10 execute an operation of the search pattern.

After starting the search and the image analysis, the control section 27 checks whether or not a face has been detected as an analysis result of the captured image signal in step F103 until one-time search of a search pattern in step F104, that is, a search operation of the search pattern shown in FIG. 10 ends.

If a face is detected in the search process of the search pattern shown in FIG. 10, the subject detection processing is completed at that point in time and the process proceeds from step F103 to the composition processing in step F3 of FIG. 12.

On the other hand, if a face is not detected even if the search of the search pattern is completed, the process proceeds from step F104 to step F105 in which the control section 27 checks whether or not the search has been performed N times.

The N times is set as an upper limit by which a search of the search pattern shown in FIG. 10 is executed in one area (search range shown in FIG. 11). For example, when 2 times is set as the upper limit, N=2 is set. Undoubtedly, the value of N is not limited to 2, and may be appropriately set. Hereinafter, an explanation will be given in the case of N=2.

When the first search operation ends, the control section 27 proceeds from step F105 to step F106 to perform angle-of-view change control. That is, the control section 27 moves the zoom lens to the tele side by a predetermined amount from the wide end until then. This makes it easy to recognize a face of a person present at a position distant in the front depth direction.

Then, the process returns to step F102 to start a second search and image analysis for face detection. Also in the second time, a search of the search pattern shown in FIG. 10 is performed.

If a face is detected in the second search process, the subject detection processing is completed at that point in time and the process proceeds from step F103 to the composition processing in step F3 of FIG. 12.

On the other hand, if a face is not detected even if the second search is completed, the process proceeds from step F104 to step F105. Since N-time searches end at this point in time, the process proceeds to step F107. In this case, the control section 27 determines that there is no person in the current search range (for example, the first partial search range DV1 shown in FIG. 11). Then, the control section 27 instructs the camera platform 10 to move to the next area, for example, to the second partial search range DV2. Specifically, the control section 27 instructs panning of 90°.

Then, the control section 27 sets the zoom lens to the wide end in step F101 and then starts first search operation control and face detection in a new area, for example, in the second partial search range DV2 in step F102.

Figure 13:
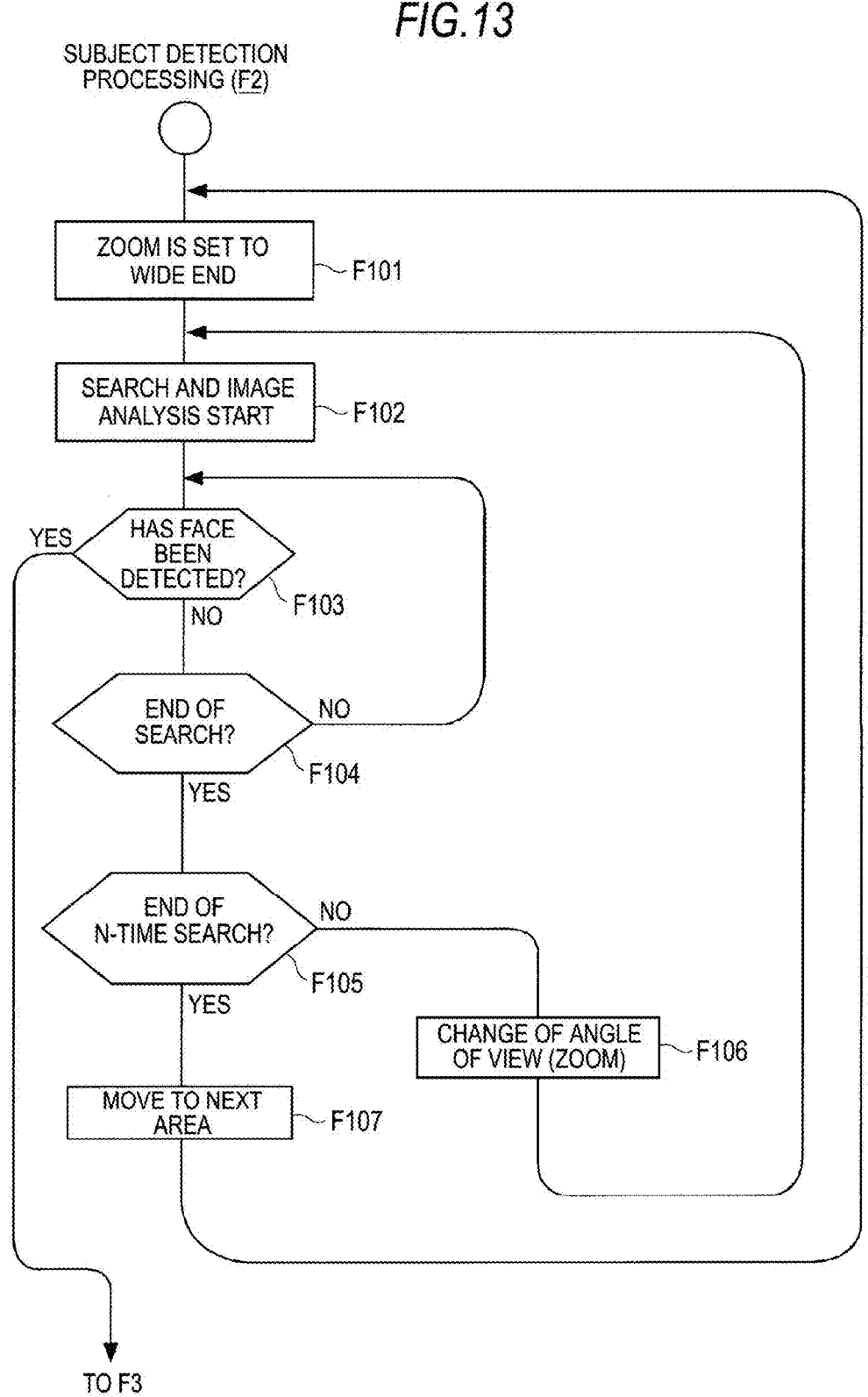
FIG. 13 is a flow chart of a first processing example of the embodiment.

In the first processing example shown in FIG. 13, an operation shown in FIGS. 14A to 14C is performed.

As shown in FIG. 14A, if a face is detected in a certain search range by a first search operation, the subject detection processing is ended at that point in time and the process proceeds to composition processing.

As shown in FIG. 14B, if a face is not detected in a certain search range by the first search operation, the angle of view is changed to perform a second search operation. If a face detected by the second search operation, the subject detection processing is ended at that point in time and the process proceeds to composition processing.

As shown in FIG. 14C, if a face is not detected in a certain search range by the first search operation and the second search operation after changing the angle of view, a movement to the next area is made to perform the same search operation.

In the first processing example, in one search range, the first search is performed in a state where the zoom magnification is set to the wide end and the zoom magnification is changed to perform the second search. Accordingly, a wide range search is performed in the first search and a two-step search is performed in the front depth direction in the first and second searches. As a result, appropriate subject detection by which, for example, a face of a person present at the distant position can also be detected becomes possible.

[5-2: Second Processing Example]

A second processing example as the subject search processing in step F2 will be described with reference to FIG. 15.

In addition, the same step number is given to the same processing as in FIG. 13, and a repeated explanation thereof will be omitted.

Figure 15:
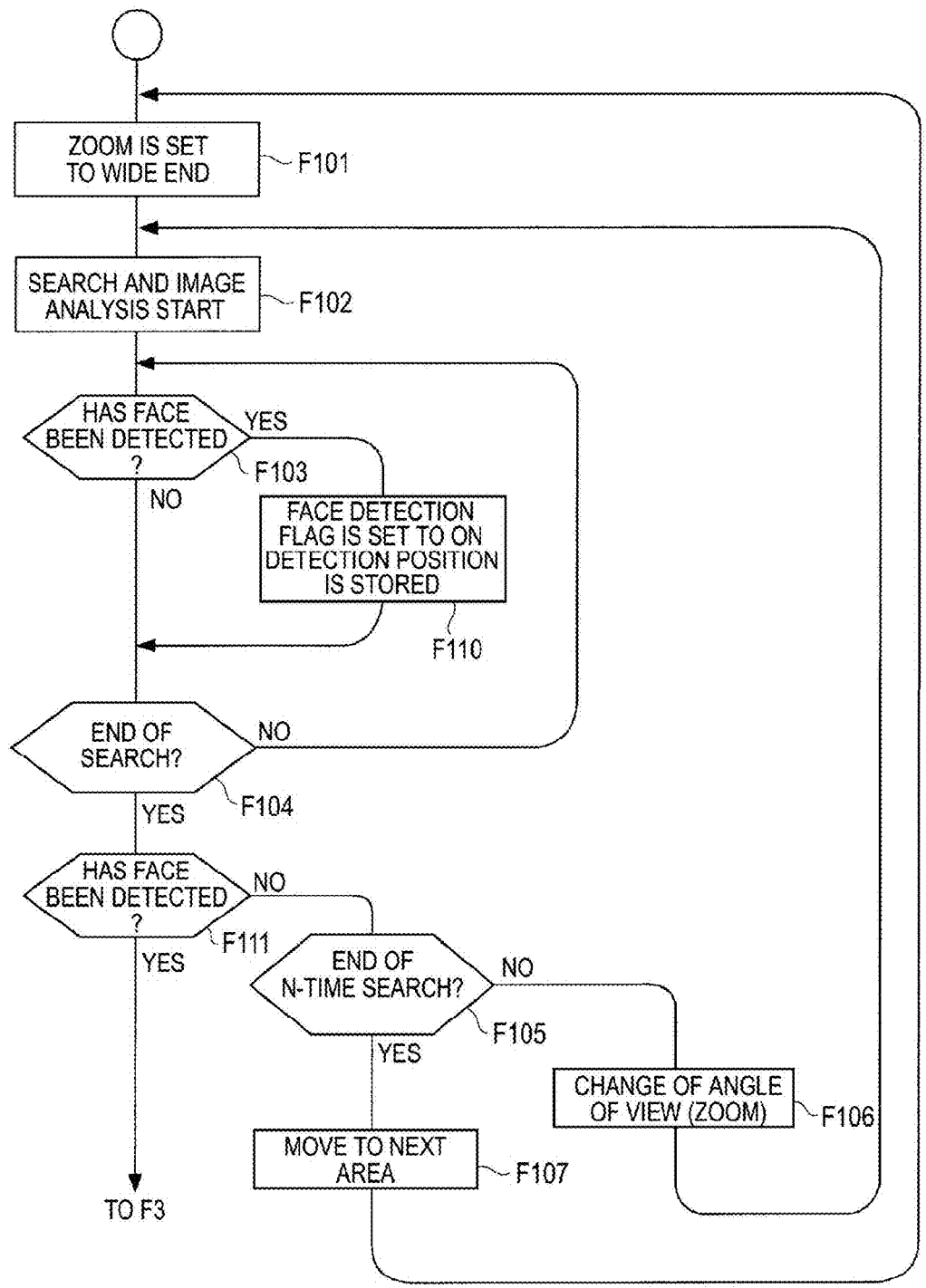
FIG. 15 is a flow chart of a second processing example of the embodiment.

Referring to FIG. 15, a first search starts in step F102. If a face is detected until a search of the search pattern shown in FIG. 10 is completed, the control section 27 proceeds from step F103 to step F110 to set the face detection flag to ON. In addition, the detection position at this time, that is, a pan position and a tilt position are stored.

Then, when the first search ends, the control section 27 proceeds from step F104 to step F111 to check whether or not a face has been detected in the search process. That is, it is determined whether or not the face detection flag is ON.

If the face detection flag is ON, the process proceeds to the composition processing in step F3.

If the face detection flag is not ON, the control section 27 proceeds to step F105. When N=2 is assumed, the control section 27 performs angle-of-view change control (zoom control) in step F106 at the end of the first search and returns to step F102 to perform second search operation control.

Then, if the face detection flag is ON in step F111 at the end of the second search, the process proceeds to the composition processing in step F3. On the other hand, if the face detection flag is not ON, the process proceeds from step F105 to step F107 in which control to move the search range to the next area is performed, and the process returns to step F101.

Figure 16:
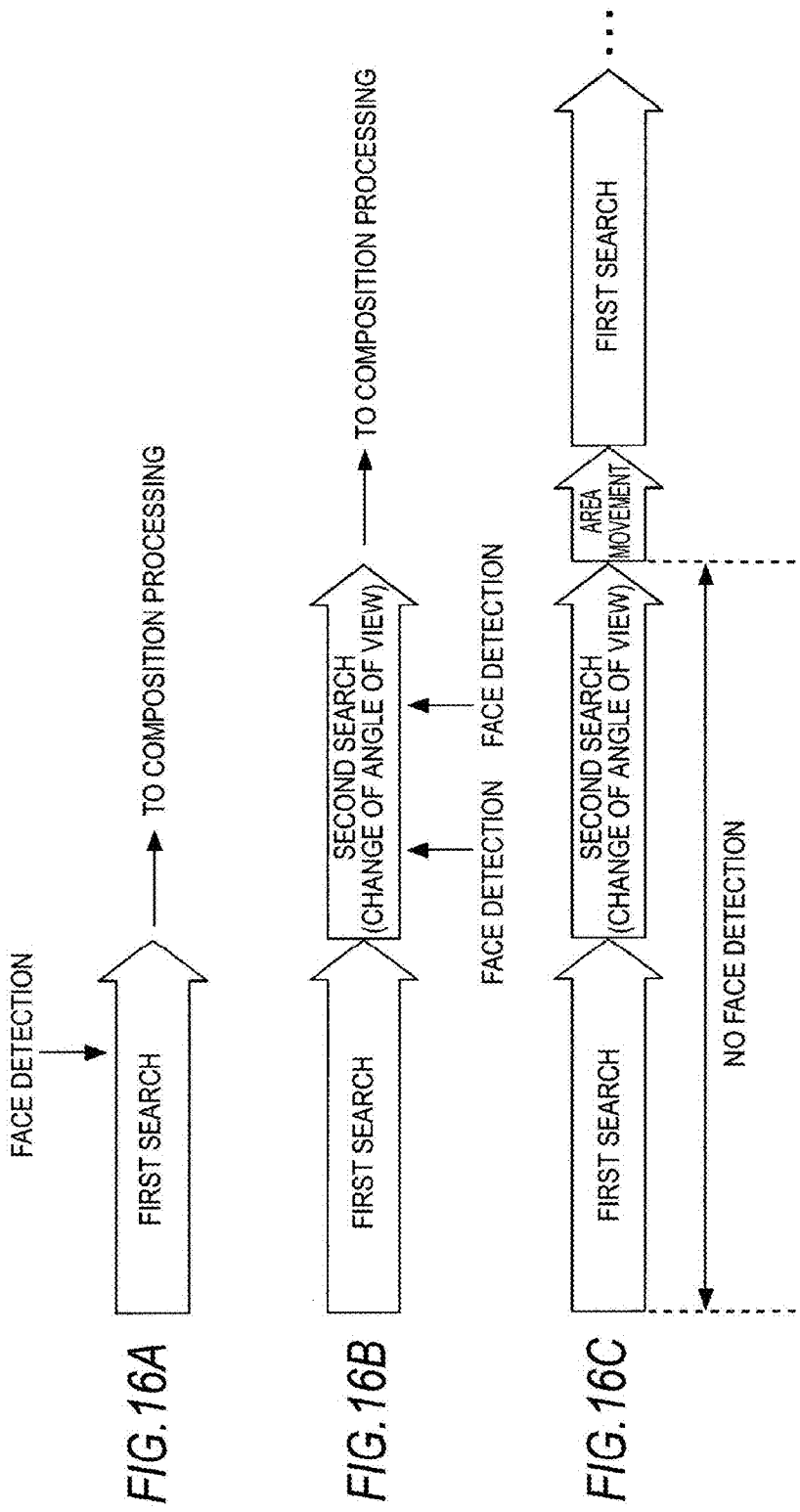
FIGS. 16A to 16C are explanatory views of a subject detection operation in the second processing example of the embodiment.

In the second processing example shown in FIG. 15, an operation shown in FIGS. 16A to 16C is performed.

As shown in FIG. 16A, if one or more faces are detected in a certain search range by a first search operation, the subject detection processing is ended at the end of the first search and the process proceeds to composition processing.

As shown in FIG. 16B, if a face is not detected in a certain search range by the first search operation, the angle of view is changed to perform a second search operation. If one or more faces (for example, two faces in the drawing) are detected by the second search operation, the subject detection processing is ended at the end of the second search operation and the process proceeds to composition processing.

As shown in FIG. 16C, if a face is not detected in a certain search range by the first search operation and the second search operation after changing the angle of view, a movement to the next area is made to perform the same search operation.

Also in the second processing example, a wide range search is performed in the first search and a two-step search is performed in the front depth direction in the first and second searches, similar to the first processing example. Accordingly, appropriate and efficient subject detection becomes possible.

Moreover, in this case, a plurality of persons can be detected by one search. When two or more faces are detected, the information regarding the angle detection position is also stored. Accordingly, since composition processing based on the detection positions of the faces is possible, more appropriate composition control can be easily realized.

[5-3: Third Processing Example]

A third processing example as the subject search processing in step F2 will be described with reference to FIG. 17.

In addition, the same step number is given to the same processing as in FIG. 13.

Figure 17:
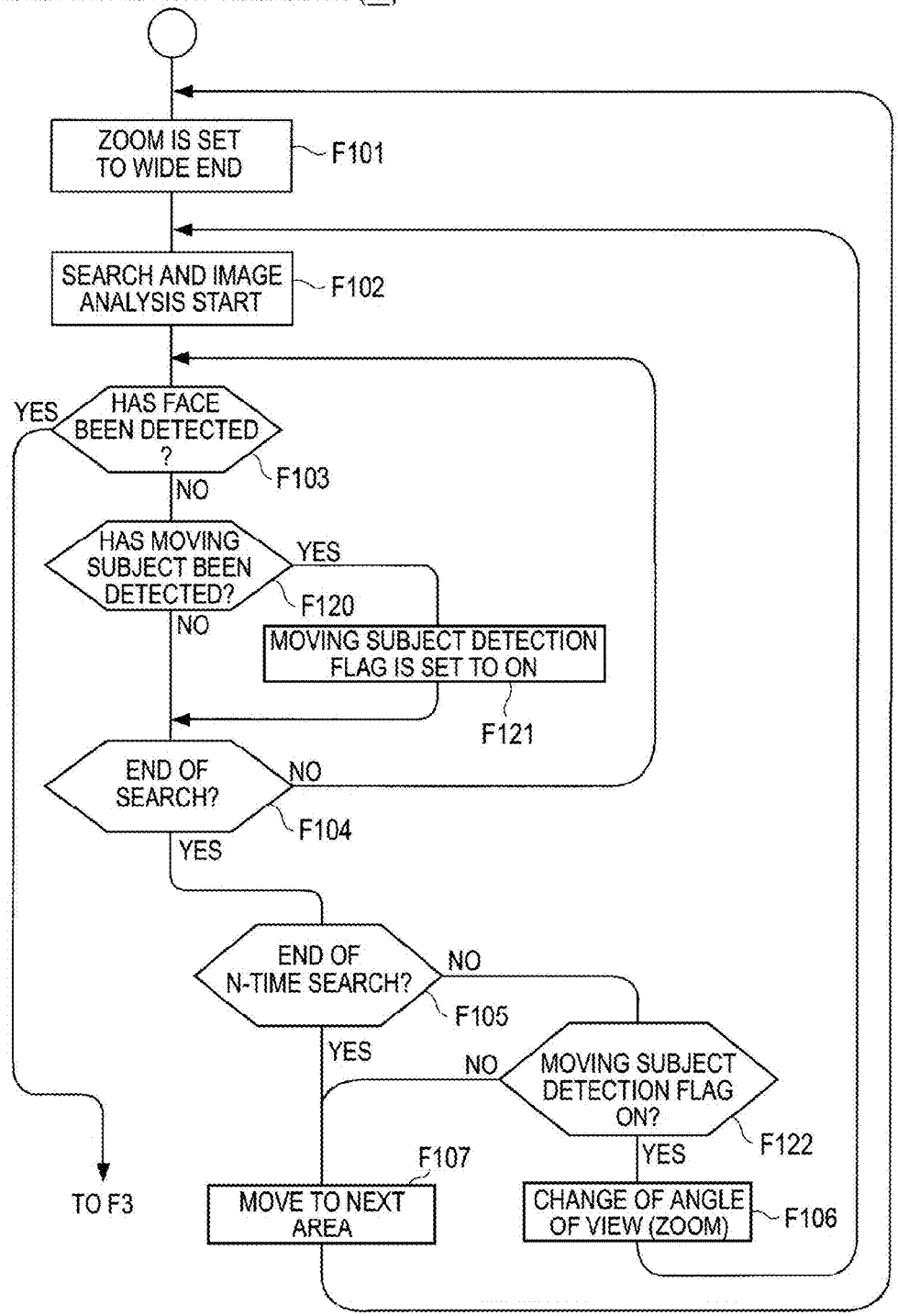
FIG. 17 is a flow chart of a third processing example of the embodiment.

When the subject detection processing in step F2 starts, first, the control section 27 sets a zoom lens of the optical system section 21 to the wide end in step F101 of FIG. 17.

Then, the control section 27 starts search operation and analysis processing of a captured image signal in step F102.

In the third processing example, however, not only face detection but also detection regarding whether or not there is a moving subject, that is, whether or not there is an image in motion, such as a person, is performed in the analysis processing of a captured image signal.

After starting the search and the image analysis, the control section 27 checks whether or not a face has been detected as an analysis result of the captured image signal in step F103 until one-time search of a search pattern in step F104, that is, a search operation of the search pattern shown in FIG. 10 ends.

During this period, the control section 27 also checks whether or not a moving subject has been detected as an analysis result of the captured image signal in step F120.

If a moving subject is detected, the control section 27 proceeds to step F121 to set the moving subject detection flag to ON.

If a face is detected in the search process of the search pattern shown in FIG. 10, the subject detection processing is completed at that point in time and the process proceeds from step F103 to the composition processing in step F3 of FIG. 12.

On the other hand, if a face is not detected even if the search of the search pattern is completed, the process moves from step F104 to step F105 in which the control section 27 checks whether or not the search has been performed N times (for example, twice).

When the first search operation ends, the control section 27 proceeds from step F105 to step F122 to check whether or not the moving subject detection flag was ON in the search process.

If the moving subject detection flag was ON, the control section 27 proceeds to step F106 to perform angle-of-view change control. That is, the control section 27 moves the zoom lens to the tele side by a predetermined amount from the wide end until then. This makes it easy to recognize a face of a person present at a position distant in the front depth direction.

Then, the process returns to step F102 to start a second search and image analysis.

On the other hand, if it is checked that the moving subject detection flag is OFF in step F122, the control section 27 proceeds to step F107 to perform control to move the search range to the next area without performing the second search. That is, the control section 27 determines that there is no person in the current search range (for example, the first partial search range DV1 shown in FIG. 11) and moves to the second partial search range DV2 which is a next area.

Then, the control section 27 sets the zoom lens to the wide end in step F101 and then starts first search operation control and detection of a face and a moving subject in the new area, for example, in the second partial search range DV2 in step F102.

Moreover, if a face is detected in the second search process, the subject detection processing is completed at that point in time and the process proceeds from step F103 to the composition processing in step F3 of FIG. 12.

On the other hand, if a face is not detected even if the second search is completed, the control section 27 proceeds from step F104 to step F105. Since N-time searches end at this point in time, the process proceeds to step F107 to perform control to move the search range to the next area. Then, the control section 27 sets the zoom lens to the wide end in step F101 and then starts first search operation control and detection of a face and a moving subject in the new area in step F102.

In the third processing example shown in FIG. 17, the following operation is performed.

If a face is detected in a certain search range by a first search operation, the subject detection processing is ended at that point in time and the process proceeds to composition processing.

Figures 18A, 18B:
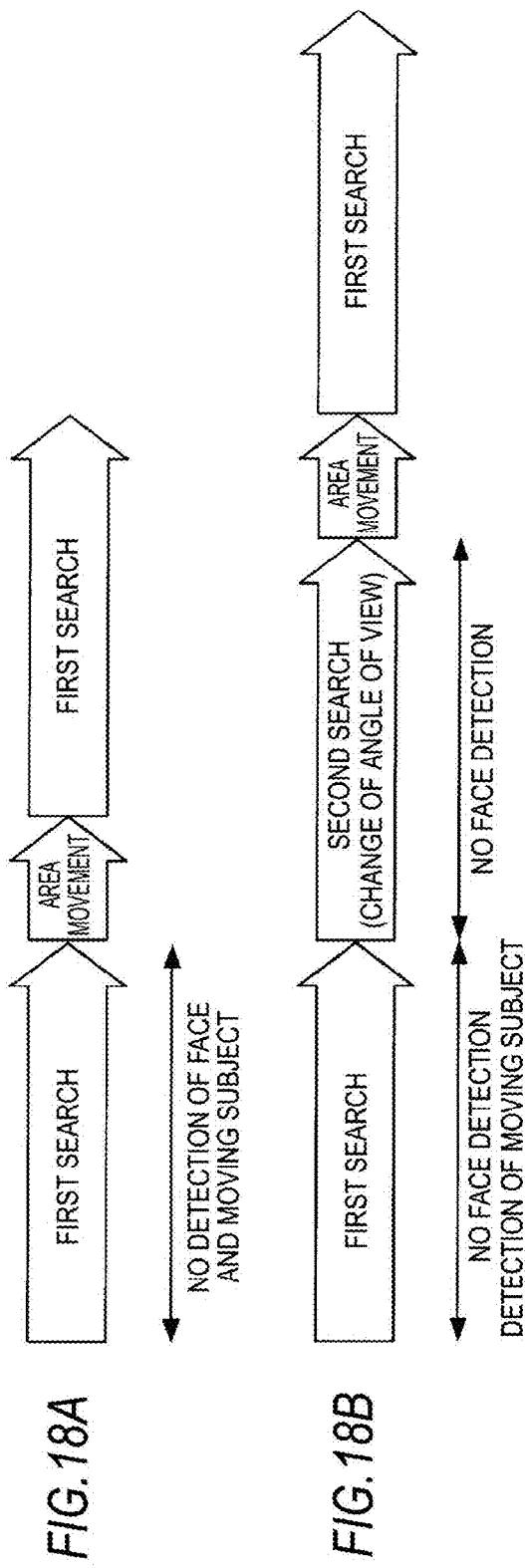
FIGS. 18A and 18B are explanatory views of a subject detection operation in the third processing example of the embodiment.

On the other hand, as shown in FIG. 18A, if neither a face nor a moving subject is detected in a certain search range by the first search operation, the search range is moved to the next area to perform the same search operation.

Moreover, as shown in FIG. 18B, if a face is not detected but a moving subject is detected in a certain search range by the first search operation, the angle of view is changed to perform a second search operation. If a face is not detected even in the second search operation, the search range is moved to the next area to perform the same search operation. Although not shown, if a face is detected by the second search operation, the subject detection processing is ended at that point in time and the process proceeds to composition processing.

In the third processing example, when a moving subject is detected even if a face is not detectable in the first search, the zoom magnification is changed to perform the second search. Detection of a moving subject indicates a possibility that there will be a person in the search range. For example, when a person is present at a position distant in the front depth direction of the digital still camera 1, face detection is difficult in the first search in a state where the zoom magnification is set to the wide end. However, a motion image can be determined relatively easily.

That is, detection of a moving subject in the first search indicates a possibility that a face could be detected if an angle of view is changed.

In this case, therefore, a second search operation is performed after the angle of view is changed.

On the other hand, if neither a face nor a moving subject is detected in the first search, a possibility that no person will be present in the search range is very high. For this reason, moving the search range to the next area without performing the second search operation is preferable in terms of search efficiency.

Thus, according to the third processing example, executing a search twice in one search range is performed when it is determined that the second search is very necessary due to detection of a moving subject. Therefore, since the second search operation is performed when it is very necessary to execute the second search operation after changing the angle of view, appropriate subject detection can be realized very efficiently.

[5-4: Fourth Processing Example]

Figure 19:
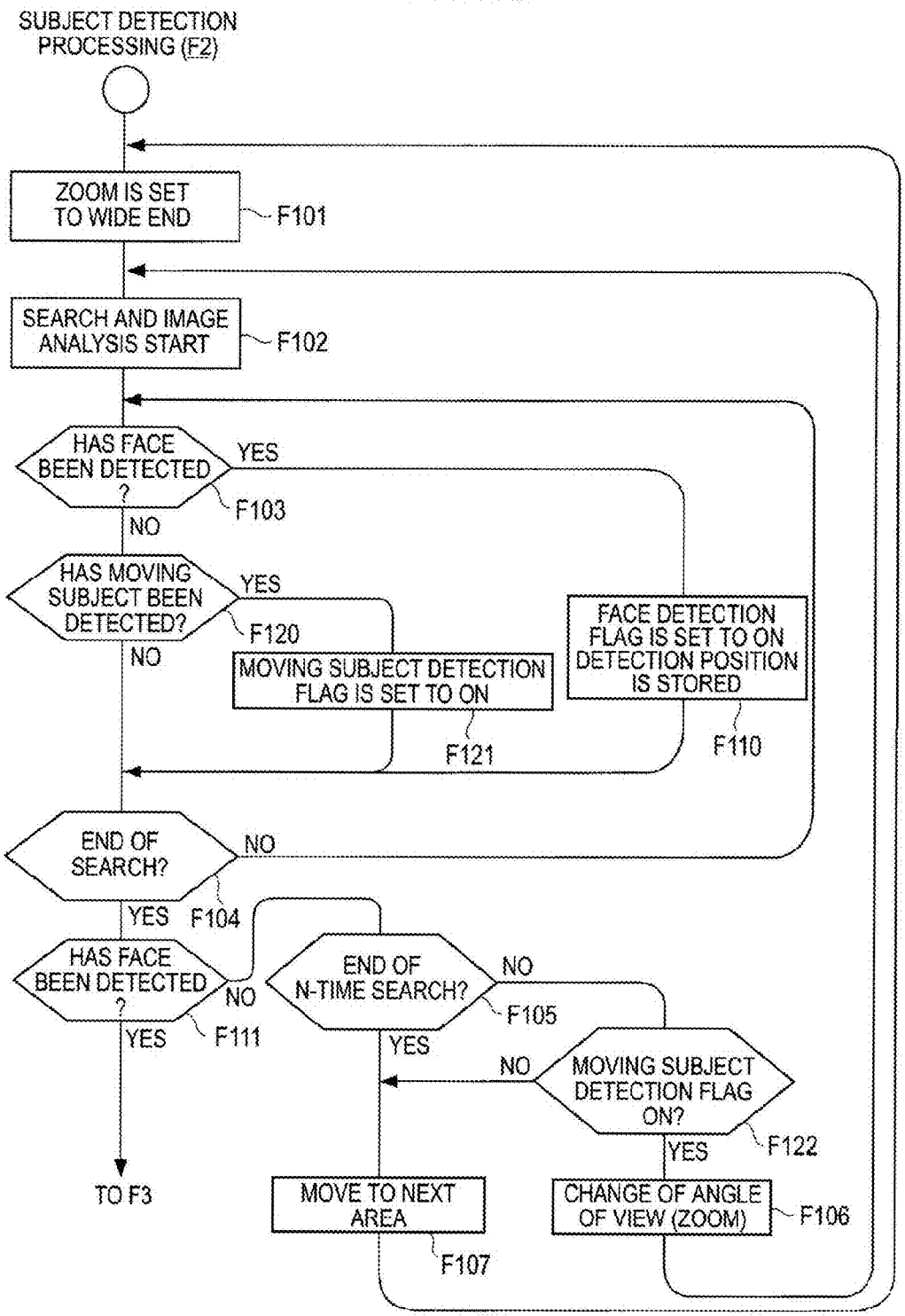
FIG. 19 is a flow chart of a fourth processing example of the embodiment.

A fourth processing example will be described with reference to FIG. 19. In FIG. 19, the same step number is given to the same processing as in FIG. 17.

When the subject detection processing starts, first, the control section 27 sets a zoom lens of the optical system section 21 to the wide end in step F101 of FIG. 17.

Then, the control section 27 starts search operation and analysis processing of a captured image signal in step F102. Also in the fourth processing example, not only face detection but also detection regarding whether or not there is a moving subject image is performed in the analysis processing of a captured image signal.

After starting the search and the image analysis, the control section 27 checks whether or not a face has been detected as an analysis result of the captured image signal in step F103 until one-time search of a search pattern in step F104, that is, a search operation of the search pattern shown in FIG. 10 ends. If a face is detected, the control section 27 proceeds from step F103 to step F110 to set the face detection flag to ON. In addition, the detection position at this time, that is, a pan position and a tilt position are stored.

During this period, the control section 27 also checks whether or not a moving subject has been detected as an analysis result of the captured image signal in step F120.

If a moving subject is detected, the control section 27 proceeds to step F121 to set the moving subject detection flag to ON.

Then, when the first search ends, the control section 27 proceeds from step F104 to step F111 to check whether or not a face has been detected in the search process. That is, it is determined whether or not the face detection flag is ON. If the face detection flag is ON, the process proceeds to the composition processing in step F3.

If the face detection flag is not ON, the control section 27 proceeds to step F105. When N=2 is assumed, the control section 27 proceeds to step F122 at the end of the first search and checks whether or not the moving subject detection flag was ON in the search process.

If the moving subject detection flag was ON, the control section 27 proceeds to step F106 to perform angle-of-view change control. That is, the control section 27 moves the zoom lens to the tele side by a predetermined amount from the wide end until then. This makes it easy to recognize a face of a person present at a position distant in the front depth direction.

Then, the process returns to step F102 to start a second search and image analysis.

On the other hand, if it is checked that the moving subject detection flag is OFF in step F122, the control section 27 proceeds to step F107 to perform control to move the search range to the next area without performing the second search. That is, the control section 27 determines that there is no person in the current search range and moves the search range to the next area.

Then, the control section 27 sets the zoom lens to the wide end in step F101 and then starts first search operation control and detection of a face and a moving subject in the new area in step F102.

Then, if the face detection flag is ON in step F111 at the end of the second search, the process proceeds to the composition processing in step F3. On the other hand, if the face detection flag is not ON, the process proceeds from step F105 to step F107 in which control to move the search range to the next area is performed, and the process returns to step F101.

In the fourth processing example shown in FIG. 19, the following operation is performed.

If a face is detected in a certain search range by a first search operation, the subject detection processing is ended at the end of the first search and the process proceeds to composition processing.

Moreover, if neither a face nor a moving subject is detected in a certain search range by the first search operation, the search range is moved to the next area to perform the same search operation.

Moreover, if a face is not detected but a moving subject is detected in a certain search range by the first search operation, the angle of view is changed to perform a second search operation. If a face is also detected in the second search operation, the subject detection processing is ended at the end of the second search operation and the process proceeds to composition processing. If a face is not detected even in the second search operation, the search range is moved to the next area to perform the same search operation.

In the fourth processing example, a wide range search is performed in the first search and a two-step search is performed in the front depth direction in the first and second searches, similar to the first to third processing examples. Accordingly, appropriate and efficient subject detection becomes possible.

In addition, similar to the second processing example, a plurality of persons can be detected by one search. When two or more faces are detected, the information regarding the angle detection position is also stored. Accordingly, since composition processing based on the detection positions of the faces is possible, more appropriate composition control can be easily realized.

Moreover, similar to the third processing example, executing a search twice in one search range is performed when it is determined that the second search is very necessary due to detection of a moving subject. Therefore, since the second search operation is performed when it is very necessary to execute the second search after changing the angle of view, the efficiency of subject detection can be further improved.

[5-5: Fifth Processing Example]

A fifth processing example will be described with reference to FIG. 20. In addition, the same step number is given to the same processing as in FIG. 19 (fourth processing example), and a repeated explanation thereof will be omitted.

Figure 20:
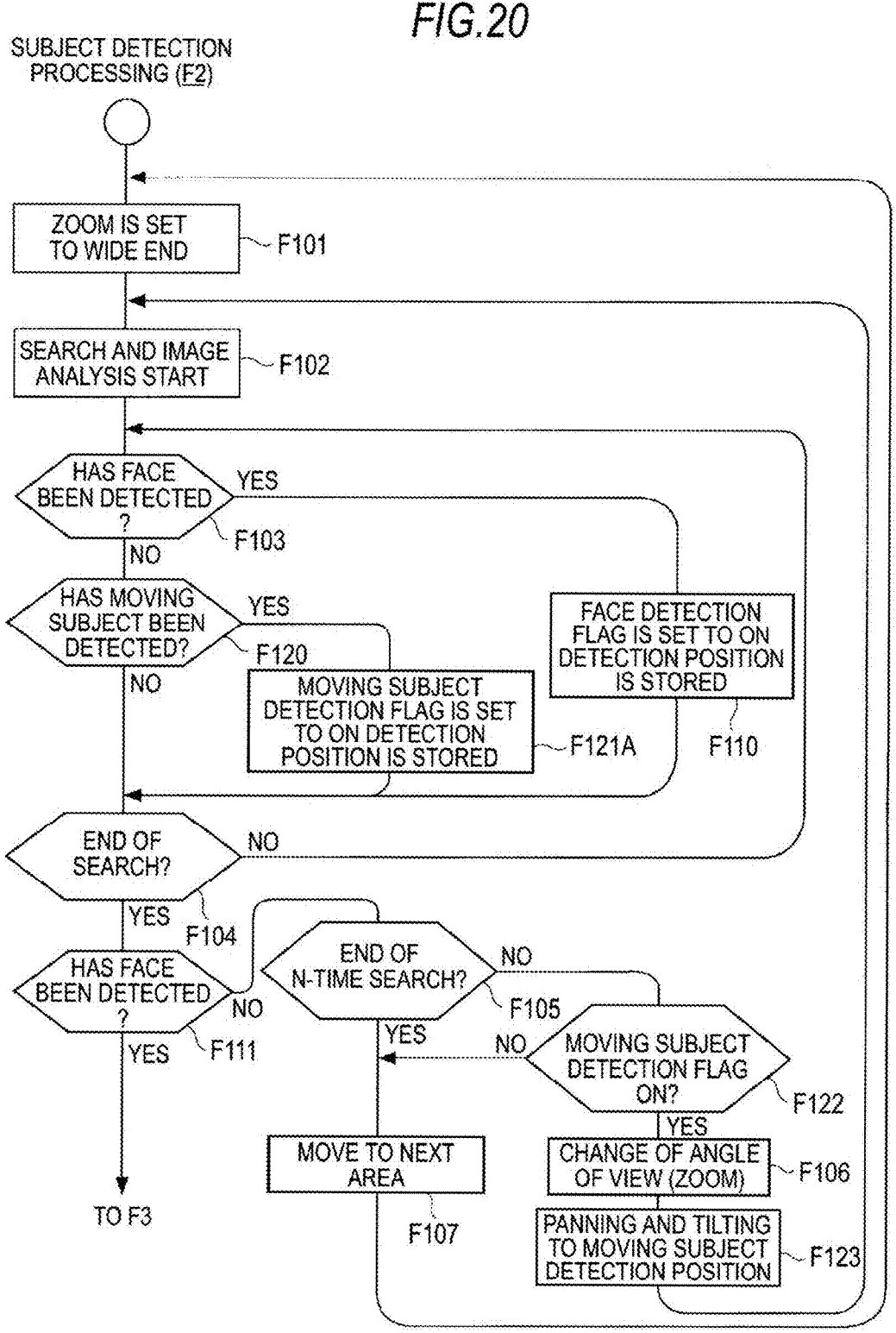
FIG. 20 is a flow chart of a fifth processing example of the embodiment.

In the processing example shown in FIG. 20, the control section 27 proceeds from step F120 to step F121A when a moving subject is detected in a search process. Moreover, in this case, a moving subject detection flag is set to ON and the detection position at this time, that is, a pan position and a tilt position are stored.

If the face detection flag is OFF at the end of the first search, the control section 27 proceeds to steps F104->F111->F105->F122.

Then, if it is checked that the moving subject detection flag is ON in step F122, the control section 27 proceeds to step F106 to perform angle-of-view change control. That is, the control section 27 moves the zoom lens to the tele side by a predetermined amount from the wide end until then. This makes it easy to recognize a face of a person present at a position distant in the front depth direction.

Then, in step F123, the control section 27 performs control for panning and tilting to the moving subject detection position. That is, using the moving subject detection position stored in step F121A, the control section 27 controls the camera platform 10 so as to be at the pan and tilt positions at the time of detection.

Then, the process returns to step F102 to start a second search and image analysis.

Other processing is the same as that in FIG. 19.

According to the fifth processing example, when the second search is performed due to detection of a moving subject, the field of view of the digital still camera 1 is first moved to the moving subject detection position and then the process starts. For this reason, if a moving subject is a person, it is possible to increase a possibility that a face will be quickly detected in the second search operation. As a result, a possibility that a more efficient search will be executed can be increased.

[5-6: Sixth Processing Example]

A sixth processing example will be described with reference to FIG. 21. In addition, the same step number is given to the same processing as in FIG. 19 (fourth processing example), and a repeated explanation thereof will be omitted.

Figure 21:
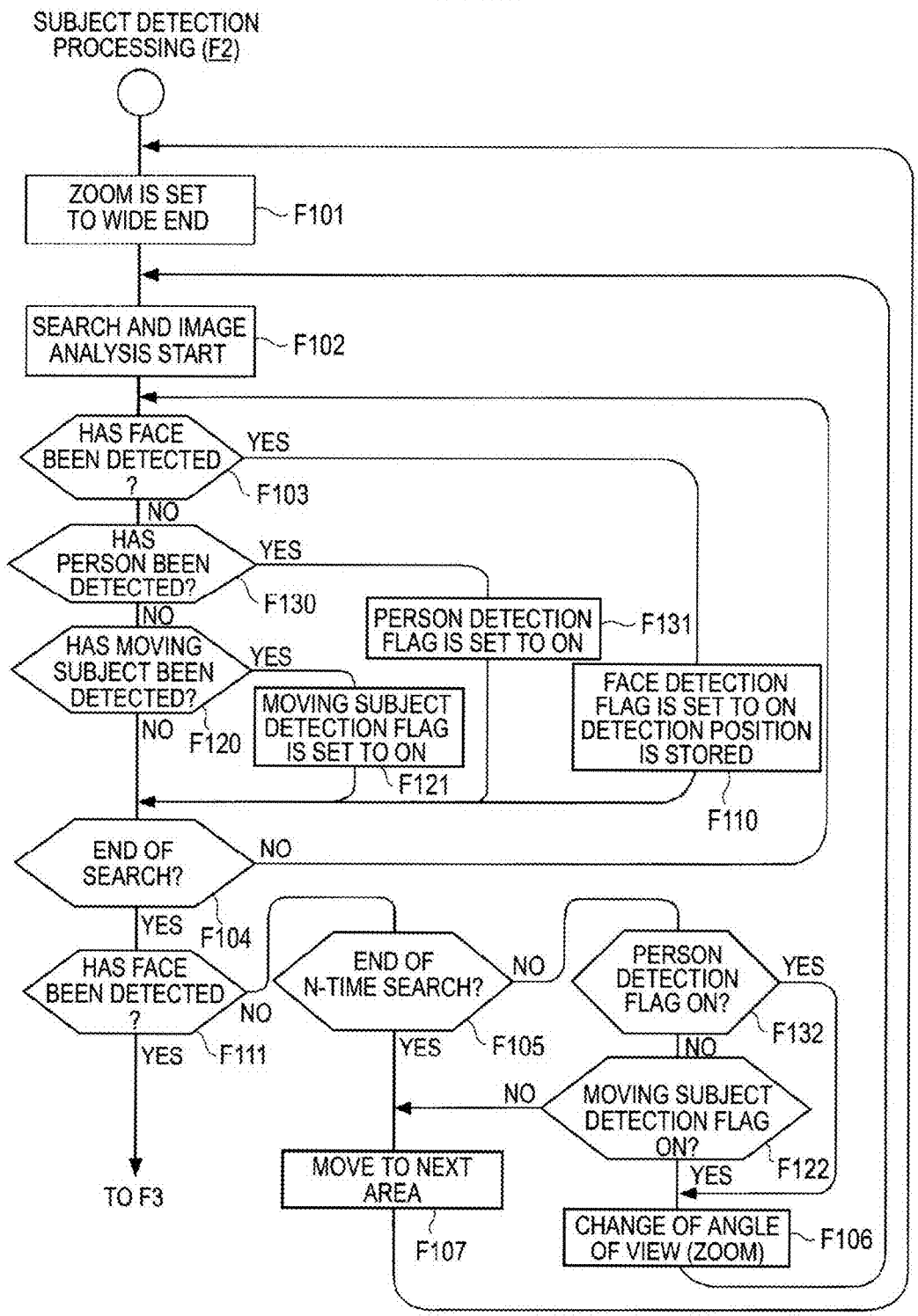
FIG. 21 is a flow chart of a sixth processing example of the embodiment.

Also in the processing example shown in FIG. 21, search control and image analysis are started in step F102. However, in the image analysis in this case, not only face recognition and detection of a moving subject but also processing of person detection is performed. The person detection referred to herein is a processing of determining whether or not an image of the entirety or part of the human body is included in a captured image signal.

After starting the search and the image analysis, the control section 27 checks whether or not a face has been detected in step F103 until the search operation ends, similar to the fourth processing example. If a face is detected, the control section 27 proceeds from step F103 to step F110 to set the face detection flag to ON. In addition, the detection position at this time, that is, a pan position and a tilt position are stored.

During this period, the control section 27 also checks whether or not a moving subject has been detected as an analysis result of the captured image signal in step F120. If a moving subject is detected, the control section 27 proceeds to step F121 to set the moving subject detection flag to ON.

During this period, the control section 27 also checks whether or not an image of a person has been detected as an analysis result of the captured image signal in step F130.

If a person is detected, the control section 27 proceeds to step F131 to set the person detection flag to ON.

If the face detection flag is OFF at the end of the first search, the control section 27 proceeds to steps F104->F111->F105->F132.

Then, if it is checked that the person detection flag is ON in step F132, the control section 27 proceeds to step F106 to perform angle-of-view change control. That is, the control section 27 moves the zoom lens to the tele side by a predetermined amount from the wide end until then.

In addition, if the person detection flag is OFF, the control section 27 checks a moving subject detection flag in step F122. If it is checked that the moving subject detection flag is ON, the control section 27 proceeds to step F106 to perform angle-of-view change control.

Thus, if either the person detection flag or the moving subject detection flag is ON, the second search is performed after the angle of view is changed.

On the other hand, if both the person detection flag and the moving subject detection flag are OFF, the control section 27 performs control of moving the search range to the next area in step F107 without performing the second search.

Other processing is the same as that in FIG. 19.

According to the sixth processing example, if a moving subject or a person is detected even if a face is not detectable in the first search, the second search is performed after the angle of view is changed. That is, it is determined whether or not a second search is necessary according to detection of a moving subject or a person.

Therefore, since the second search operation is performed when it is very necessary to execute the second search after changing the angle of view, appropriate subject detection can be realized very efficiently.

Moreover, as a modification, a processing example may also be considered in which processing related to the moving subject detection in steps F120, F121, and F122 is removed and the second search is performed when a person is detected.

[5-7: Utilization of Imaging History Information]

Next, an example of processing using the imaging history information will be described.

In the first to sixth processing examples described above, change of the angle of view for the second search is performed in step F106 shown in FIGS. 13, 15, 17, 19, 20, and 21.

In this case, the control section 27 may perform processing of setting the zoom magnification using the imaging history information stored at that point in time.

FIG. 22 shows a functional configuration when processing using the imaging history information is performed. For example, in the digital still camera 1 (control section 27), an imaging history information managing section 84 is provided in addition to the functions described in FIG. 9.

When performing the release in step F5 of FIG. 12, that is, when performing imaging recording of a still image, the imaging history information managing section 84 performs processing of storing various kinds of information at the time of imaging recording and processing of referring to the imaging history information stored. Storage of the imaging history information is preferably performed using a storage region of the RAM 29 or the flash memory 30, for example.

An example of the content of the imaging history information will be described with reference to FIG. 23.

The imaging history information is formed by a group of unit imaging history information 1 to n. Information regarding the history corresponding to one automatic imaging recording is stored in one unit imaging history information.

As shown in FIG. 23, one unit imaging history information includes a file name, imaging date and time information, zoom magnification information, pan and tilt position information, information regarding the number of subjects, individual recognition information, information regarding the position within an image frame, size information, face direction information, expression information, and the like.

The file name indicates a file name of the captured image data recorded as a file in the memory card 40 by corresponding automatic imaging recording. In addition, the file name may be replaced with a file path or the like. In any case, the unit imaging history information can be matched with the captured image data stored in the memory card 40 by such information of a file name and a file path.

The imaging date and time information indicates date and time when corresponding automatic imaging recording was executed.

The zoom magnification information indicates the zoom magnification at the time of imaging recording (at the time of release).

The pan and tilt position information indicates the pan and tilt position set when corresponding automatic imaging recording was executed.

The information regarding the number of subjects indicates the number of subjects (individual subjects detected) existing in an image (image frame) of the corresponding captured image data, that is, captured image data stored in the memory card 40 by corresponding automatic imaging recording.

The individual recognition information is information (individual recognition information) of a result of individual recognition for each subject existing in an image of the corresponding captured image data.

The information regarding the position within an image frame is information indicating the position of each subject, which exists in an image of the corresponding captured image data, within the image frame. For example, the information regarding the position within an image frame may be expressed as a coordinate position of a point corresponding to the center of gravity calculated for each subject within the image frame.

The size information is information indicating the size of each subject, which exists in an image of the corresponding captured image data, within the image frame.

The face direction information is information indicating the face direction detected for each subject existing in an image of the corresponding captured image data.

The expression information is information indicating how the expression, which is detected for each subject existing in an image of the corresponding captured image data, is (for example, distinction regarding whether it is a smiling face or not).

Various kinds of processing become possible by holding the imaging history information based on such content, for example. Regarding the subject detection processing in the present embodiment, utilization of the following imaging history information may be considered.

When the process proceeds to step F106 in each drawing described above in order to perform a second search, the control section 27 extracts the information regarding the pan and tilt position, which is included in the current search range, from the unit imaging history information 1 to n. Then, the latest unit imaging history information is selected from the extracted information with reference to the imaging date and time information.

The zoom magnification information in the unit imaging history information is referred to. Then, control for change of the angle of view is performed according to the zoom magnification information.

By performing such processing, an angle of view matched with a distance, at which a person was present in the past close to the present, can be set. As a result, the probability that a face will be detected early in the second search can be increased.

In addition, when searching for the imaging history information to be referred to and extracting the unit imaging history information with the zoom magnification information, it is also possible to use other information, for example, the information regarding the number of subjects, the size information, the face direction information, and the like for refined selection. For example, the zoom magnification may be adjusted using the size information, or the information corresponding to a face direction of a forward direction may be selected.

[5-8: Modifications]

While each example as subject detection processing in the automatic still image capture mode has been described, various modifications of the processing may be considered.

For example, although the first to sixth processing examples were described with an image of a person's face as a target subject, it is needless to say that it is not limited to the face image, and a subject according to the purpose of imaging may be detected.

In addition, although the upper limit of search in step F105 was set to N=2 in the first to sixth processing examples, N may also be set to 3 or more.

For example, in case of N=3, the search operation may be performed up to three times in one search range. In this case, it is preferable to change the angle of view in the second search and the angle of view in third search.

For example, in the first search, a zoom lens is set to the wide end in order to perform a short-distance search. Then, in the second search, the zoom lens is moved to the tele side by the predetermined amount in order to perform a middle-distance search. In the third search, the zoom lens is further moved to the tele side in order to perform a long-distance search. Through such multiple steps, a subject search corresponding to each distance may be performed.

In addition, although the search range was divided into a plurality of areas as shown in FIG. 11 in each example described above, it is needless to say that the present invention is not limited to dividing the range of 360° into four areas as shown in FIG. 11. The search range may also be divided into three or five or more areas.

Alternatively, a search of the search pattern shown in FIG. 10 may be performed with the range of 360° (or if the movable range of a camera platform is less than 360°, the movable range) as one area.

Moreover, in each example described above, a search of the search pattern shown in FIG. 10 is also performed in the second search similar to the first search. However, a processing example may be considered in which the search pattern is changed to another pattern from the second search.

Moreover, it may also be considered to reduce the search speed from the second search so that a face image can be easily detected.

In addition, although image analysis processing for face detection is performed from an EE image (for example, a pixel size of 350×240) of a normal camera in consideration of the situation of throughput, for example, the processing region may be extended if a face is not detected.

That is, the number of pixels of an actual captured image signal is much larger than the EE image size according to the image sensor 22. However, the image data for analysis processing may be subjected to thinning-out processing in consideration of the load of the analysis processing so that it has a pixel size of 350×240, for example. In this case, since the size of a face image or the like is reduced, face recognition becomes difficult. Accordingly, in the image analysis in the second search, the thinning-out rate is reduced so that the image analysis is performed in a pixel size of 640×480, for example. This can increase the probability of face recognition.

Alternatively, it may also be considered to increase a subject detectable distance, for example, by removing a region of the end while maintaining the size of the EE image and then expanding and processing the result.

In addition, in each processing example described above, the zoom lens is set to the wide end first in step F101. This is to set a wide range as a search target.

In previous cameras, the wide end was generally 35 mm. In recent years, however, a digital still camera with a wide end of 24 mm, for example, or digital still cameras with wide ends less than 24 mm are increasing.

In a state of very wide angle, the image size of one face in a captured image signal is reduced. Accordingly, it becomes difficult to detect a face. That is, a detectable distance is extremely decreased.

For this reason, the setting in step F101 may be setting to 35 mm, for example, instead of setting to the wide end.

Moreover, although moving subject detection is used in the third to sixth processing examples, the detectable distance may be increased by combination of a subject detection method other than the face detection, for example, by expanding a portion with a temperature close to the temperature of a human body using a temperature sensor.

<6. Other Examples of Functional Configuration>

In each processing example of the above embodiments, control processing based on the functional configuration shown in FIG. 9 (FIG. 22) was basically described.

Figure 24:
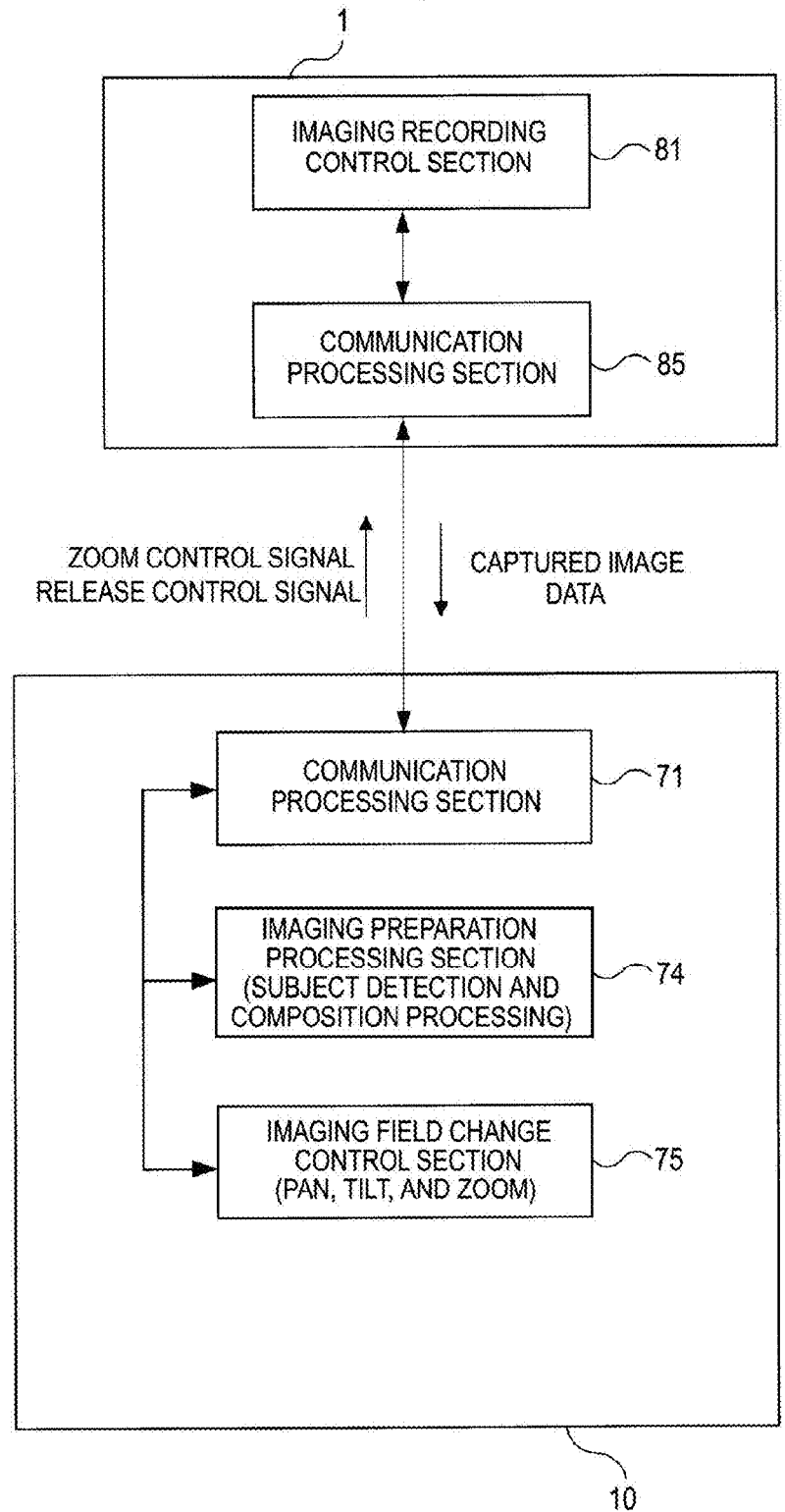
FIG. 24 is an explanatory view of another example of the control function configuration of the embodiment.

For example, in the imaging system configured to include the digital still camera 1 and the camera platform 10, an example of the functional configuration other than the example shown in FIG. 9 may also be considered. FIG. 24 shows an example.

FIG. 24 shows an example where the digital still camera 1 has only the imaging record control section 81 and the communication processing section 85. In addition, the communication processing section 71, an imaging preparation processing section 74, and an imaging field change control section 75 are provided in the camera platform 10 (control section 51). In the example shown in FIG. 22, the imaging history information managing section may be provided in the camera platform 10.

Control processing executed by each functional section is basically the same as that described in FIG. 9, but the following points are different.

The imaging preparation processing section 74 receives the captured image data as each frame image from the signal processing section 24 of the digital still camera 1 in order to perform subject detection processing or composition processing. Then, image analysis is performed, and the same subject detection processing or composition processing as described above is performed.

In this case, if an imaging section for subject detection or composition processing is provided in the camera platform 10, the subject detection processing or the composition processing can be performed on the basis of the captured image data in the imaging section.

According to the instruction from the imaging preparation processing section 74, the imaging field change control section 75 controls the pan driving section 55 and the tilt driving section 58 to execute pan and tilt operations for subject detection or composition adjustment.

Moreover, for zoom control, the imaging field change control section 75 outputs a zoom control signal to the control section 27 (imaging record control section 81) of the digital still camera 1 through the communication processing section 71. The imaging record control section 81 executes and controls the zoom processing for composition adjustment on the basis of the zoom control signal.

That is, FIG. 24 shows an example in which the camera platform 10 performs automatic imaging mode control actively to give a necessary instruction to the control section 27 of the digital still camera 1 so that automatic still image capturing is realized.

In this case, the processing shown in FIGS. 13, 15, 17, 19, 20, and 21 as the first to sixth processing examples or processing using the imaging history information can be executed as processing of the control section 51 of the camera platform 10.

As described above, FIGS. 9, 22, and 24 show examples of the functional configuration. When the functional configuration shown in FIG. 9 or 22 is adopted, the imaging control device according to the embodiment of the present invention is mounted in the digital still camera 1. In addition, when the functional configuration shown in FIG. 24 is adopted, the imaging control device according to the embodiment of the present invention is mounted in the camera platform 10.

In addition, the imaging control device according to the embodiment of the present invention includes at least the imaging preparation processing section 82 (74) and the imaging field change control section 83 (75). Therefore, even if other functional sections are separately provided in individual devices, a device including at least the imaging preparation processing section 82 (74) and the imaging field change control section 83 (75) becomes an example of implementation of the present invention. Alternatively, when each of the imaging preparation processing section 82 (74) and the imaging field change control section 83 (75) is considered as a function of a separate device, the present invention is realized in a system of each device.

<7. Processing at the Time of Handheld Imaging>

In the above embodiments, examples applied to the subject detection processing in the automatic still image capture mode using the digital still camera 1 and the camera platform 10 were described.

Here, a processing example when a user performs imaging using only the digital still camera 1, that is, using the digital still camera 1 in a handheld manner will be described.

In the case of using the digital still camera 1 in a handheld manner, a user usually determines a subject while changing the zoom magnification arbitrarily by zoom operation.

Here, when the user determines a subject or composition or at the release timing, the control section 27 of the digital still camera 1 may perform, for example, face detection and perform predetermined processing.

For example, face detection in a captured image signal may be performed, and autofocus control may be performed on the basis of a face image.

Similarly, auto white balance processing or exposure adjustment processing may be performed on the basis of a face image portion. In addition, effect processing of the face image portion may be performed.

Moreover, face image detection and smiling face detection may be performed so that release processing is automatically performed at a timing when a person of a subject makes a smiling face.

For such processing, also when the digital still camera 1 is used in a handheld manner, the subject detection processing is performed with a face as a target, for example.

Figure 25:
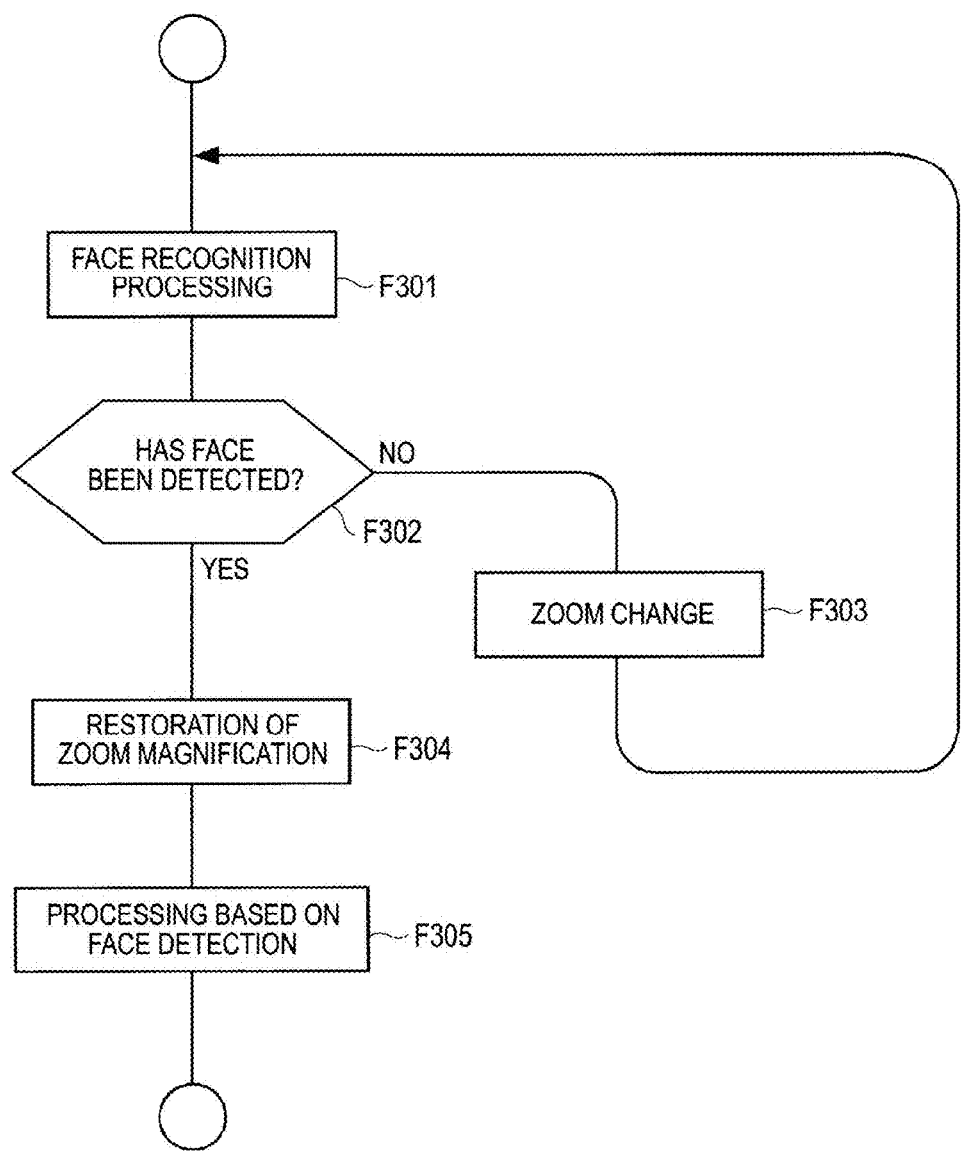
FIG. 25 is a flow chart of an example of processing in the case of handheld imaging of the embodiment.

Also in the case of using the digital still camera 1 alone, the control section 27 may perform processing shown in FIG. 25 when performing subject detection processing with a face image as a target, for example.

For example, it is assumed that a user selects a subject while performing zoom operation or the like and face recognition is performed by image analysis when the release button 31*a* is half-pressed.

The control section 27 performs face recognition processing by analyzing a captured image signal in step F301. If a face is not detectable, the control section 27 proceeds from step F302 to step F303 to change the angle of view. That is, the control section 27 drives a zoom lens to change the zoom magnification. Then, the face recognition processing in step F301 is performed.

If a face image is detected, the control section 27 proceeds from step F302 to step F304 to restore the zoom magnification to a state before the change according to the processing in step F303, that is, to a zoom state set by the user operation.

Then, in step F305, processing based on the face detection, for example, the autofocus control described above may be performed.

Thus, by performing face recognition processing while changing the angle of view, the probability that a face will be detected can be increased even when face detection is difficult due to the distance to a subject person. Moreover, by the detection of a face, processing based on the face detection can be executed.

After the face detection, the zoom magnification is made to return to the state set by the user operation in step F304, so that a problem does not occur at the time of subsequent release or the like.

<8. Program>

A program according to the present embodiment is a program causing an arithmetic processing unit (for example, the control section 27), such as a CPU, to execute the processing shown in FIGS. 13, 15, 17, 19, 20, 21, and 25 or the processing using the imaging history information.

That is, the program causes the arithmetic processing unit to execute a subject detection step of detecting a predetermined target subject (for example, a face image) by analyzing a captured image signal.

Moreover, if a target subject is not detectable in the subject detection step, the program causes the arithmetic processing unit to execute an angle-of-view changing step of changing the angle of view in an imaging section by controlling an imaging field changing section (zoom mechanism).

After changing the angle of view in the angle-of-view changing step, the program causes the arithmetic processing unit to execute a subject re-detection step of performing subject detection processing.

The program according to the present embodiment may be recorded in advance in an HDD or a solid state memory as recording media built in a personal computer or an apparatus, such as the digital still camera 1 or the camera platform 10, or in a ROM in a microcomputer having a CPU.

Alternatively, the program may be temporarily or permanently stored (recorded) in removable recording media such as a flexible disc, a CD-ROM (Compact Disc Read Only Memory), a MO (Magneto Optical) disc, a DVD (Digital Versatile Disc), a Blue-ray Disc, a magnetic disk, a semiconductor memory, and a memory card. Such removable recording media may be supplied as so-called package software.

In addition, the program according to the embodiment of the present invention may be installed from removable recording media to a personal computer or the like, or may be downloaded from a download site through a network, such as a LAN (Local Area Network) or the Internet.

Through the program according to the embodiment of the present invention, an imaging apparatus and an imaging system which realize the embodiments described above can be appropriately realized and widely distributed.

The present application contains subject matter related to that disclosed in Japanese Priority Patent Application JP 2010-048793 filed in the Japan Patent Office on Mar. 5, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging control device for an imaging apparatus or an imaging system having an imaging section and an imaging field changing section, the imaging section configured to perform imaging of a subject, the imaging control device comprising:
    a determination section configured to determine whether or not a subject detecting section detects a target subject by analyzing a captured image signal acquired by the imaging section, in subject detection processing;
    an imaging field change control section configured:
        to control the imaging field changing section to change an angle of view in the imaging section, and
        in response to the determination section determining that the subject detecting section does not detect a target subject in the subject detection processing, to control the imaging field changing section to change the angle of view in the imaging section, and to control a tilt control section to search for a target subject by tilting the imaging section upward before tilting the imaging section downward,
    wherein the image control device is configured to control the subject detecting section to perform the subject detection processing subsequent to the imaging field changing section changing the angle of view.

2. The imaging control device according to claim 1, wherein the imaging field changing section comprises a zoom lens driving mechanism, and the imaging field change control section is configured to control driving of the zoom lens driving mechanism to change the angle of view in the imaging section.

3. The imaging control device according to claim 2, wherein the target subject is an image of a face of a person in a captured image signal.

4. The imaging control device according to claim 1, wherein the imaging field change control section is configured to control the imaging field changing section to change the angle of view in the imaging section in response to the determination section determining that the subject detecting section does not detect a first target subject and detecting existence of a second target subject in the subject detection processing; and
    the imaging control device is configured to control the subject detecting section to subsequently perform the subject detection processing.

5. The imaging control device according to claim 1,
    wherein the imaging field changing section comprises a zoom lens driving mechanism and an imaging direction change driving mechanism, the imaging direction change driving mechanism being configured to change an imaging direction of the imaging section, and
    wherein the imaging field change control section is configured to control, in response to the determination section determining that the subject detecting section does not detect a first target subject and detects existence of a second target subject in the subject detection processing, the imaging field changing section to change the angle of view in the imaging section and the imaging direction change driving mechanism to set the imaging direction to an imaging direction, and
    the imaging control device is configured to control the subject detecting section to perform the subject detection processing.

6. The imaging control device according to claim 4, wherein:
    the first target subject is an image of a face of a person in a captured image signal, and
    the second target subject is a moving subject image in a captured image signal or an image of a person's body.

7. The imaging control device according to claim 5, wherein:
    the first target subject is an image of a face of a person in a captured image signal, and
    the second target subject is a moving subject image in a captured image signal or an image of a person's body.

8. The imaging control device according to claim 1, further comprising:
    an imaging history information managing section configured to create imaging history information, the imaging history information comprising at least zoom information of the imaging section, in response to recording or outputting the captured image signal acquired by the imaging section as a still image signal,
    wherein the imaging field change control section is configured to control the imaging field changing section at least in part on the basis of the imaging history information to change the angle of view in the imaging section.

9. The imaging control device according to claim 2, wherein the imaging field change control section is configured to control driving of the zoom lens driving mechanism to change the angle of view in the imaging section and then to control driving of the zoom lens driving mechanism to restore the angle of view to a state before the change in response to the determination section determining that the subject detecting section detects the target subject.

10. A subject detection method of an imaging apparatus or an imaging system having an imaging section and an imaging field changing section, the method comprising acts of:
    determining whether or not a subject detecting section detects a target subject by analyzing a captured image signal acquired by the imaging section, in subject detection processing; and
    in response to determining that a target subject is not detected in the subject detection processing:
        controlling the imaging field changing section to change an angle of view in the imaging section,
        searching for a target subject by tilting the imaging section upward before tilting the imaging section downward, and
        performing the subject detection processing again after controlling the imaging field changing section to change the angle of view.

11. A non-transitory computer readable medium storing a program for operating an imaging control device for an imaging apparatus or an imaging system having an imaging section and an imaging field changing section, the program, when executed, causing a processing circuit of the imaging control device to execute:
    determination processing to determine whether or not a subject detecting section detects a target subject by analyzing a captured image signal acquired by the imaging section, in subject detection processing; and in response to determining that a target subject is not detected in the subject detection processing:
angle-of-view change processing to control the imaging field changing section to change an angle of view in the imaging section,
searching for a target subject by controlling a tilt control section to tilt the imaging section upward before tilting the imaging section downward, and
subject re-detection processing to perform the subject detection processing after changing the angle of view in the angle-of-view change processing.

12. An imaging control device for an imaging apparatus or an imaging m having an imaging section and an imaging field changing section, the imaging section configured to perform imaging of a subject, the imaging control device comprising:
a determination section configured to determine whether or not a subject detecting section detects a target subject by analyzing a captured image signal acquired by the imaging section, in subject detection processing;
a pan control section; and
an imaging field change control section configured:
to control the imaging field changing section to change an angle of view in the imaging section, and
in response to the determination that the subject detection section does not detect a target subject in the subject detection processing, to control the imaging field changing section to change the angle of view in the imaging section, and to control the pan control section to search for a target subject by panning in a first direction at a tilt angle, subsequently panning in a second direction at the tilt angle, and subsequently panning again in the first direction at the tilt angle,
wherein the imaging control device is configured to control the subject detecting section to perform the subject detection processing subsequent to the imaging field changing section changing the angle of view.

13. A subject detection method of an imaging apparatus or an imaging system having an imaging in section and an imaging in field changing section, the method comprising acts of:
determining whether or not a subject detecting section detects a target subject by analyzing a captured image signal acquired by the imaging section, in subject detection processing; and
in response to determining that a target subject is not detected in the subject detection processing:
controlling the imaging field changing section to change an angle of view in the imaging section,
searching for a target subject by panning in a first direction at a tilt angle, subsequently panning in a second direction at the tilt angle, and subsequently panning again in the first direction at the tilt angle, and
performing the subject detection processing after controlling the imaging field changing section to change the angle of view.

14. A non-transitory computer readable medium storing a program for operating an imaging control device for an imaging apparatus or an imaging system having an imaging section and an imaging field changing section, the program, when executed, causing a processing circuit of the imaging control device to execute:
determination processing to determine whether or not a subject detecting section detects a target subject by analyzing a captured image signal acquired by the imaging section, in subject detection processing; and
in response to determining that a target subject is not detected in the subject detection processing:
angle of view change processing to control the imaging field changing section to change an angle of view in the imaging section,
searching for a target subject by controlling a pan control section to pan in a first direction at a tilt angle, subsequently pan in a second direction at the tilt angle, and subsequently pan again in the first direction at the tilt angle, and
subject re-detection processing to perform the subject detection processing after changing the angle of view in the angle-of-view change processing.

15. The imaging control device according to claim 1, wherein the imaging field change control section is configured to control the imaging field changing section to change the angle of view in the imaging section by decreasing a width of the angle of view in response to the determination section determining that the subject detecting section does not detect a target subject in the subject detection processing.

16. The subject detection method according to claim 10, wherein the method comprises: in response to determining that a target subject is not detected in the subject detection processing, controlling the imaging field changing section to change the angle of view in the imaging section by decreasing a width of the angle of the view.

17. The non-transitory computer readable medium according to claim 11, wherein, in response to determining that a target subject is not detected in the subject detection processing, the program causes the processing circuit to execute angle-of-view change processing to control the imaging field changing section to change the angle of view in the imaging section by decreasing a width of the angle of the view.

* * * * *